(12) United States Patent
Appelman et al.

(10) Patent No.: US 10,911,502 B2
(45) Date of Patent: *Feb. 2, 2021

(54) SHARING SOCIAL NETWORK INFORMATION

(71) Applicant: Verizon Media Inc., New York, NY (US)

(72) Inventors: Barry Appelman, New York, NY (US); Steven Greenberg, Frederick, MD (US)

(73) Assignee: Verizon Media Inc., New York, NY (US)

( * ) Notice: Subject to any disclaimer, the term of this patent is extended or adjusted under 35 U.S.C. 154(b) by 286 days.

This patent is subject to a terminal disclaimer.

(21) Appl. No.: 16/005,066

(22) Filed: Jun. 11, 2018

(65) Prior Publication Data
US 2018/0337965 A1    Nov. 22, 2018

Related U.S. Application Data

(63) Continuation of application No. 14/330,897, filed on Jul. 14, 2014, now Pat. No. 10,021,151, which is a
(Continued)

(51) Int. Cl.
*G06Q 10/00* (2012.01)
*H04L 29/06* (2006.01)
(Continued)

(52) U.S. Cl.
CPC ........... *H04L 65/403* (2013.01); *G06Q 10/10* (2013.01); *G06Q 10/107* (2013.01); *G06Q 30/02* (2013.01);
(Continued)

(58) Field of Classification Search
CPC ...... G06Q 50/01; G06Q 10/10; G06Q 10/107; G06Q 30/02; G06Q 30/0601; G06Q 30/08; H04L 65/403
(Continued)

(56) References Cited

U.S. PATENT DOCUMENTS 5,086,394 A   2/1992  Shapira
5,276,905 A   1/1994  Hurst et al.
(Continued)

FOREIGN PATENT DOCUMENTS

GB    2368747 A    5/2002
GB    2357932 B    1/2004
(Continued)

OTHER PUBLICATIONS

5. Mai ("Buying and selling on the Internet; [Computimes, 2 Edition]". New Straits Times. Kuala Lumpur: Jun. 28, 2001. p. 53).*
(Continued)

*Primary Examiner* — Gabrielle A McCormick
(74) *Attorney, Agent, or Firm* — Bookoff McAndrews, PLLC

(57) ABSTRACT

Social network information may be shared across online service providers. Thus, one online service provider M that maintains a membership separate from a second online service provider N may nevertheless use the social network maintained by the second online service provider N to tailor content and/or services based on such social network information.

20 Claims, 19 Drawing Sheets

Related U.S. Application Data continuation of application No. 13/967,138, filed on Aug. 14, 2013, now Pat. No. 8,812,407, which is a continuation of application No. 11/079,522, filed on Mar. 15, 2005, now Pat. No. 8,538,895.

(60) Provisional application No. 60/552,718, filed on Mar. 15, 2004.

(51) Int. Cl.

| | | |
|---|---|---|
| *G06Q 10/10* | (2012.01) | |
| *G06Q 30/02* | (2012.01) | |
| *G06Q 30/06* | (2012.01) | |
| *G06Q 30/08* | (2012.01) | |
| *G06Q 50/00* | (2012.01) | |

(52) U.S. Cl.
CPC ......... *G06Q 30/0601* (2013.01); *G06Q 30/08* (2013.01); *G06Q 50/01* (2013.01)

(58) Field of Classification Search
USPC .................................................. 705/1, 319
See application file for complete search history.

(56) References Cited

U.S. PATENT DOCUMENTS

| | | |
|---|---|---|
| 5,548,637 A | 8/1996 | Heller et al. |
| 5,694,616 A | 12/1997 | Johnson et al. |
| 5,793,365 A | 8/1998 | Tang et al. |
| 5,802,470 A | 9/1998 | Gaulke et al. |
| 5,867,162 A | 2/1999 | O'Leary et al. |
| 5,940,488 A | 8/1999 | DeGrazia et al. |
| 5,987,113 A | 11/1999 | James |
| 6,065,047 A | 5/2000 | Carpenter et al. |
| 6,073,138 A | 6/2000 | de l'Etraz et al. |
| 6,088,435 A | 7/2000 | Barber et al. |
| 6,112,181 A | 8/2000 | Shear et al. |
| 6,161,130 A | 12/2000 | Horvitz et al. |
| 6,175,831 B1 | 1/2001 | Weinreich et al. |
| 6,199,103 B1 | 3/2001 | Sakaguchi et al. |
| 6,247,043 B1 | 6/2001 | Bates et al. |
| 6,269,369 B1 | 7/2001 | Robertson |
| 6,311,211 B1 | 10/2001 | Shaw et al. |
| 6,324,541 B1 | 11/2001 | de l'Etraz et al. |
| 6,330,590 B1 | 12/2001 | Cotten |
| 6,347,332 B1 | 2/2002 | Malet et al. |
| 6,374,246 B1 | 4/2002 | Matsuo |
| 6,374,290 B1 | 4/2002 | Scharber et al. |
| 6,389,372 B1* | 5/2002 | Glance .................. G06Q 30/02 702/189 |
| 6,415,318 B1 | 7/2002 | Aggarwal et al. |
| 6,421,439 B1 | 7/2002 | Liffick |
| 6,421,675 B1 | 7/2002 | Ryan et al. |
| 6,421,709 B1* | 7/2002 | McCormick ......... G06Q 10/107 709/206 |
| 6,430,604 B1 | 8/2002 | Ogle |
| 6,449,634 B1 | 9/2002 | Capiel |
| 6,480,885 B1 | 11/2002 | Olivier |
| 6,507,866 B1 | 1/2003 | Barchi |
| 6,549,937 B1 | 4/2003 | Auerbach et al. |
| 6,571,234 B1 | 5/2003 | Knight et al. |
| 6,615,241 B1 | 9/2003 | Miller et al. |
| 6,640,218 B1 | 10/2003 | Golding et al. |
| 6,647,383 B1 | 11/2003 | August et al. |
| 6,677,968 B1 | 1/2004 | Appelman |
| 6,678,719 B1 | 1/2004 | Stimmel |
| 6,697,807 B2 | 2/2004 | McGeachie |
| 6,731,308 B1 | 5/2004 | Tang et al. |
| 6,732,155 B2 | 5/2004 | Meek |
| 6,750,881 B1 | 6/2004 | Appelman |
| 6,772,188 B1 | 8/2004 | Cloutier |
| 6,788,769 B1 | 9/2004 | Waites |
| 6,800,031 B2 | 10/2004 | Di Cesare |
| 6,832,245 B1 | 12/2004 | Isaacs et al. |
| 6,839,690 B1* | 1/2005 | Foth ...................... G06Q 20/02 705/26.41 |
| 6,901,559 B1 | 5/2005 | Blum et al. |
| 6,912,563 B1 | 6/2005 | Parker et al. |
| 6,917,965 B2 | 7/2005 | Gupta et al. |
| 7,039,639 B2 | 5/2006 | Brezin et al. |
| 7,117,254 B2 | 10/2006 | Lunt et al. |
| 7,177,880 B2 | 2/2007 | Ruvolo et al. |
| 7,181,498 B2 | 2/2007 | Zhu et al. |
| 7,188,153 B2 | 3/2007 | Lunt et al. |
| 7,269,590 B2 | 9/2007 | Hull et al. |
| 7,313,760 B2 | 12/2007 | Grossman et al. |
| 2001/0005861 A1 | 6/2001 | Mousseau et al. |
| 2002/0065856 A1 | 5/2002 | Kisiel |
| 2002/0065894 A1 | 5/2002 | Dalal et al. |
| 2002/0083136 A1 | 6/2002 | Whitten et al. |
| 2002/0091667 A1 | 7/2002 | Jaipuria et al. |
| 2002/0103801 A1* | 8/2002 | Lyons .................... G06Q 30/02 |
| 2002/0112181 A1 | 8/2002 | Smith |
| 2002/0116463 A1 | 8/2002 | Hart |
| 2002/0116641 A1 | 8/2002 | Mastrianni |
| 2002/0133369 A1* | 9/2002 | Johnson ............... G06Q 10/105 705/321 |
| 2002/0169737 A1* | 11/2002 | Armstrong ............. G06Q 10/10 706/59 |
| 2002/0175953 A1 | 11/2002 | Lin |
| 2002/0178161 A1 | 11/2002 | Brezin et al. |
| 2002/0181703 A1 | 12/2002 | Logan et al. |
| 2002/0184089 A1 | 12/2002 | Tsou et al. |
| 2002/0199095 A1 | 12/2002 | Bandini et al. |
| 2003/0004855 A1 | 1/2003 | Dutta et al. |
| 2003/0004872 A1 | 1/2003 | Gardi et al. |
| 2003/0023875 A1 | 1/2003 | Hursey et al. |
| 2003/0028524 A1 | 2/2003 | Keskar et al. |
| 2003/0028595 A1* | 2/2003 | Vogt ....................... H04L 67/42 709/204 |
| 2003/0037112 A1 | 2/2003 | Fitzpatrick et al. |
| 2003/0046097 A1* | 3/2003 | LaSalle ................ G06Q 10/101 705/7.33 |
| 2003/0050916 A1 | 3/2003 | Ortega et al. |
| 2003/0055831 A1 | 3/2003 | Ryan et al. |
| 2003/0065721 A1 | 4/2003 | Roskind |
| 2003/0088554 A1 | 5/2003 | Ryan et al. |
| 2003/0101226 A1 | 5/2003 | Quine |
| 2003/0105822 A1 | 6/2003 | Gusler et al. |
| 2003/0131046 A1 | 7/2003 | Newton et al. |
| 2003/0167324 A1* | 9/2003 | Farnham ................ G06Q 10/10 709/224 |
| 2003/0172349 A1 | 9/2003 | Katayama et al. |
| 2003/0187813 A1 | 10/2003 | Goldman et al. |
| 2004/0042599 A1* | 3/2004 | Zaner .................... H04M 1/2757 379/144.01 |
| 2004/0054736 A1 | 3/2004 | Todd et al. |
| 2004/0056901 A1 | 3/2004 | March et al. |
| 2004/0117443 A1 | 6/2004 | Barsness |
| 2004/0122681 A1 | 6/2004 | Ruvolo et al. |
| 2004/0122685 A1* | 6/2004 | Bunce .................... G06Q 20/12 705/67 |
| 2004/0122810 A1 | 6/2004 | Mayer |
| 2004/0122855 A1 | 6/2004 | Ruvolo et al. |
| 2004/0186738 A1 | 9/2004 | Reisman |
| 2004/0201624 A1 | 10/2004 | Crawford |
| 2004/0210844 A1 | 10/2004 | Pettinati et al. |
| 2004/0215648 A1 | 10/2004 | Marshall et al. |
| 2004/0215721 A1 | 10/2004 | Szeto et al. |
| 2004/0215793 A1* | 10/2004 | Ryan ...................... G06Q 50/01 709/229 |
| 2004/0221309 A1* | 11/2004 | Zaner .................... H04L 12/1822 725/46 |
| 2005/0015432 A1* | 1/2005 | Cohen .................. H04L 12/66 709/201 |
| 2005/0021750 A1* | 1/2005 | Abrams .................. G06Q 10/10 709/225 |
| 2005/0038856 A1 | 2/2005 | Krishnasamy et al. |
| 2005/0044152 A1 | 2/2005 | Hardy et al. |
| 2005/0050143 A1 | 3/2005 | Gusler et al. |
| 2005/0055416 A1 | 3/2005 | Heikes et al. |
| 2005/0076240 A1 | 4/2005 | Appelman |

(56) References Cited

U.S. PATENT DOCUMENTS

| | | | |
|---|---|---|---|
| 2005/0076241 A1 | 4/2005 | Appelman | |
| 2005/0097321 A1* | 5/2005 | Zhu | H04L 63/0823 |
| | | | 713/166 |
| 2005/0108035 A1* | 5/2005 | Childers | G06Q 50/01 |
| | | | 705/319 |
| 2005/0114229 A1 | 5/2005 | Ackley et al. | |
| 2005/0154913 A1* | 7/2005 | Barriga | G06F 21/33 |
| | | | 726/4 |
| 2005/0177486 A1 | 8/2005 | Yeager | |
| 2005/0197846 A1 | 9/2005 | Pezaris et al. | |
| 2005/0198131 A1 | 9/2005 | Appelman et al. | |
| 2005/0198172 A1 | 9/2005 | Appelman et al. | |
| 2005/0198268 A1 | 9/2005 | Chandra | |
| 2005/0246420 A1 | 11/2005 | Little | |
| 2006/0031772 A1 | 2/2006 | Valeski | |
| 2006/0129678 A1 | 6/2006 | Morita | |
| 2006/0190536 A1 | 8/2006 | Strong et al. | |
| 2007/0250566 A1 | 10/2007 | Appelman et al. | |
| 2008/0255989 A1 | 10/2008 | Altberg et al. | |
| 2009/0043844 A1 | 2/2009 | Zimmet et al. | |
| 2009/0070306 A1 | 3/2009 | Stroe et al. | |

FOREIGN PATENT DOCUMENTS

| | | |
|---|---|---|
| WO | 0079396 A1 | 12/2000 |
| WO | 0106748 A1 | 1/2001 |
| WO | 0167787 A2 | 9/2001 |
| WO | 0203216 A1 | 1/2002 |
| WO | 2005086723 A2 | 9/2005 |
| WO | 2006068955 A2 | 6/2006 |

OTHER PUBLICATIONS

"A Countermeasure to Duplicate-detecting Anti-spam Techniques," Robert J. Hall, AT&T Labs Technical Report 99.9.1, 1999, Abst. and pp. 1-26.

"A Reputation System for Peer-to-Peer Networks," Gupta et al., Jun. 1-3, 2003, NOSSDAV'03, Monterey, California, pp. 144-152.

"Announce: Implementation of E-mail Spam Proposal," Maurice L. Marvin, news.admin.net-abuse.misc, Aug. 3, 1996, 2 pages.

"AOL, ICQ to Interoperate—But in a Limited Fashion". Oct. 30, 2002 by Kevin Richard, InstantMessagingPlanet.www.instantmessagingplanet.com/public/article.php/1490771.

"BestCalls.com Announces the BestCalls Technology Index," Business Wire, Jun. 30, 1999, Business Wire, p. 1.

"Better Bayesian Filtering," Paul Graham, Jan. 2003, pp. 1-11, http://www.paulgraham.com/better.html.

"Business at Cyberspeed; Brainstorm Becomes Quick Internet Hit," Walker, Jan. 24, 1999, The Washington Post, p. A.01 (4 total pages).

"CrushParty.com: Help," retrieved Jun. 12, 2002 from the World Wide Web: http://www.crushparty.com/help.jsp, 3 pages.

"Degrees of Separation Email Spam Protection," Halfbakery: Degrees of Separation Email Spam Protection, reprinted from http://halfbakery.com/idea/Degrees-20of-20Separation-20Email-20Spam-20Protecti . . . printed on Mar. 1, 2004 (3 pages).

"Digital Artifacts for Remembering and Storytelling: Post History and Social Network Fragments," Viegas et al., retrieved from the World Wide Web: http://we.media.mit.edu/~fviegas/papers/posthistory-snf.pdf, 10 total pages.

"Finding Others Online: Reputation Systems for Social Online Spaces," Jensen et al., Apr. 20-25, 2002, CHI, Minneapolis, Minnesota, vol. 4, Issue 1, pp. 447-454.

"Hottie or Nottie? Web Site Voters Let You Know Whether You Sizzle or Fizzle," Marino, Jul. 11, 2001, Florida Times Union, p. C.1. (2 total pages).

"Icq.anywhere, Email Features—Email Center—ICQ.com," retrieved Apr. 29, 2004 from the World Wide Web: http://www.icq.com/email/popular-features.html, pp. 1-5.

"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnl+0&adxnnlx=107029 . . . , printed on Nov. 5, 2004 (3 pages).

"Instant Messaging for Gamers," PC Gamer, May 2004, vol. 11, No. 5, p. 28.

"Learning Spam: Simple Techniques for Freely-Available Software," Bart Massey et al, Computer Science Dept., Portland, OR USA, 2003, pp. 1-14.

"Learning to Filter Spam E-Mail: A Comparison of a Naïve Bayesian and a Memory-Based Approach," Ion Adroutsopoulos et al., University of Athens, Sep. 2000, pp. 1-12.

"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.

"PieSpy-Inferring and Visualizing Social Network on IRC," PieSpy Social Network Bot, reprinted from http://lister.linux-srv.anlx.net/piespy printed on Mar. 11, 2004 (18 pages.).

"Plaxo," Plaxo, reprinted from http://web.archive.org/web/20041105072256/http://www.plaxo.com/ printed on Nov. 5, 2004 (available on Feb. 14, 2004) (2 pages).

"Plaxo-Update Your Address Book," Plaxo Contact Networks, reprinted from http://web.archive.org/web/20030218233638/http://www.plaxo.com/ printed on Nov. 5, 2004 (available on Feb. 18, 2003) (1 page).

"Reflections on Friendster, Trust and Intimacy," Danah Boyd. Ubicomp 2003, Workshop Application for the Intimate Ubiquitous Computing Workshop. Seattle, WA, Oct. 12-15, 2003.

"Reputation Systems," Resnick et al., Dec. 2000, Communications of the ACM, vol. 43, No. 12, pp. 45-48.

"RIM Road: Software: Internet & Network: Webmessenger RIM J2ME/Instant Messaging," retrieved Apr. 29, 2004 from the World Wide Web: http://www.rimrod.com/software/riml/Webmessenger-RIM-J2ME-Instant -Messaging-20 . . . , pp. 1-4.

"Six Degrees—New Programs Help Companies 'Mine Workers' Relationships for Key Business Prospects," William M. Bulkeley et al., Marketplace, The Wall Street Journal, Aug. 4, 2003.

"Social Nets Find Friends in VCs," Joanna Glasner, http://www.wired.com/news , Nov. 17, 2003, pp. 1-3.

"Social Network Fragments: An Interactive Tool for Exploring Digital Social Connections." Danah Boyd, Jeff Potter. Sketch at SIGGRAPH 2003. San Diego, California: ACM, Jul. 27-31, 2003.

"Social Networking for Business: Release 0.5," Esther Dyson, Esther Dyson's Monthly Report, vol. 21, No. 10, Nov. 25, 2003, www.edventure.com.

"Social Sites Clicking With Investors," Washingtonpost.com: Social Sites Clicking With Investors, reprinted from http://www.washingtonpost.com/ac2/wp-dyn/A32066-2003Nov12?language= printer printed on Nov. 5, 2004.

"Social Social Networks: Deodorant for the Soul?," Esther Dyson, Esther Dyson's Monthly Report, vol. 21, No. 11, Dec. 12, 2003, www.edventure.com.

"Socialware: Multiagent Systems for Supporting Network Communities," Hattori et al., Mar. 1999, Association for Computing Machinery, Communications of the ACM, vol. 42, Issue 3, pp. 55ff.

"Spoke Builds on Social Networking Patent Portfolio," Spoke Builds on Social Networking Patent Portfolio, reprinted from http://www.internetnews.com/ent-news/print.php/3073621 printed on Nov. 5, 2004 (3 pages).

"Support Vector Machines for Spam Categorization," Harris Drucker et al., IEEE Transactions on Neural Networks, vol. 10, No. 5, Sep. 1999, pp. 1048-1054.

"Support Vector Machines," Marti Hearst, IEEE Intelligent Systems, Jul./Aug. 1998, pp. 18-28.

"SVM-based Filtering of E-mail Spam with Content-specific Misclassification Costs," Aleksander Kolcz et al., TextDM'2001 (IEEE ICDM-2001 Workshop on Text Mining), San Jose, CA, 2001, pp. 1-14.

"SWF Seeks Attractive Head Shot; To Stand Out, Online Daters Pay for Professional Photos; Cropping out the Ex-Wife," Leiber, Nov. 19, 2003, The Wall Street Journal, p. D.1.

(56) References Cited

OTHER PUBLICATIONS

"Technical Solutions for Controlling Spam," Shane Hird, Proceedings of AUUG2002, Melbourne, Sep. 4-6, 2002, 17 pages.
"Technology Journal: Changing Chat-Instant Messaging is Taking Off, and for Some Users It's Nuzzling Out the Phone," Nick Wingfield, Asian WSJ, Sep. 2000, (5 pages).
"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"Telstra targets Net spammers," J. Dudley, news.com.au, Dec. 2, 2003, 2 pages.
"Text Categorization with Support Vector Machines: Learning with Many Relevant Features," Thorsten Joachims, University of Dortmund, Computer Science Dept., LS-8 Report 23, 1998, 18 pages.
"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).
"Trillian Discussion Forums—Howto: Import ICQ 2003a Contact List," retrieved Apr. 29, 2004 from the World Wide Web: http://trillian.cc/forums/showthread.php?s+&threadid=36475, pp. 1-2.
"Welcome to Huminity World of Connections," Huminity-Home, reprinted from http://web.archive.org/web/20030228131435/www.huminity.com/default.php?internationa . . . printed on Nov. 5, 2004 (available on Feb. 2, 2003) (1 page).
"Will You Buy a Car From This Man?," Leander Kahney, Oct. 6, 2003, pp. 1-3.
America Online Inc., "AOL Instant Messenger", Aug. 29, 2000, Internet: www.aol.com/aim/, (18 pages).
America Online Inc., New AIM 4.7, Sep. 27, 2001, Internet: http://aim.aol.com, (7 pages).
CNET Networks Inc., "PopUp Killer", Sep. 13, 2001, Internet: download.cnet.com/downloads/0-10059-100-6932612.html, (3 pages).
Ed Bott and Ron Person, Using Windows 95 with Internet Explorer 4.0, Feb. 17, 1998, Que, Special Edition, (21 pages).
Home-tribe.net, http://washingtondc.tribe.net/message/24434d1b-817b-4580-aa42-3bffa15f26a?page=1 (4 total page).
http://www.friendster.com (17 pages).
International Search Report and Written Opinion issued in International Application No. PCT/US05/45663, dated Apr. 11, 2008.
International Search Report dated Feb. 15, 2006 for International Application No. PCT/US05/07204.
International Search Report issued in Application Serial No. PCT/US05/08476, dated Oct. 16, 2006, (9 pages).
International Search Report issued in International Application No. EP03731244, dated Aug. 30, 2005, (4 pages).
Mai, Neo and Ken Neo. "Buying and selling on the Internet; [Computimes, 2 Edition]". New Straits Times. Kuala Lumpur: Jun. 28, 2001. p. 53.
McKendrick, Joseph; "Internet Call Centers: New Era in Customer Service"; Feb. 2002; V10, n2, pp. 22, (4 pages).
Mutton, Paul, "PieSpy Social Network Bot Inferring and Visualizing Social Networks IRC," Dec. 4, 2003, Internet Archive Wayback Machine http://web.archive.org/web/20031204185952/http://jibble.org/piespy, 17 pages.
Neo Mai, Ken Neo. "Buying and selling on the Internet; [Computimes, 2 Edition]". New Straits Times. Kuala Lumpur: Jun. 28, 2001. p. 53.
Nick Wingfield; Technology Journal: Changing Chat-Instant Messaging is Taking Off, and for Some Users It's Nuzzling Out the Phone; Asian WSJ; Sep. 2000.
PCT International Search Report and Written Opinion issued in International Application No. PCT/US05/07204, dated Feb. 15, 2006.
PCT International Search Report issued in International Application No. PCT/US05/08476, dated Oct. 16, 2006.
R. Movva & W. Lai, "MSN Messenger Service 1.0 Protocol," Aug. 1999, Internet Draft, http://tools.ietf.org/id/draft-movva-msn-messenger-protocol-oo.txt, 28 pages.
Ryze home page, www.ryze.com, Dec. 21, 2003, available at http://web.archive.org/web/20031221010006/http://ryze.com, printed Mar. 16, 2005.
Supplementary European Search Report issued in European Application No. 05857099.5-1238/1836596 PCT/US2005045663, dated Nov. 7, 2008, (5 pages).
VisiblePath webpages, www.visiblepath.org, Dec. 3, 2003, available at http://web.archive.org/web/20031203132211/http://www.visiblepath.com, printed Mar. 16, 2005.
WebmasterWorld.com Inc., "HTML and Browsers", Mar. 5, 2001, Internet: www.webmaster.com/forum21/367.htm, (2 pages).
Written Opinion dated Feb. 15, 2006 for International Application No. PCT/US05/07204.
ZeroDegress home page, www-zerodegrees.com, Jan. 24, 2004, available at http://web.archive.org/web/20040204153037/www.zerodegrees.com/home.htm, printed Mar. 16, 2005.

\* cited by examiner

USER

| Degrees of Separation | User | Whom Connected To |
|---|---|---|
| 2 | User5 | User4 |
| 1 | User4 | User1 |
| 1 | User3 | User2 |
| 0 | User2 | User |
| 0 | User1 | User |

Registration

☐ Associate my social network information with this account

First Name: _____ 356

Last Name: _____

Username: _____

Password: _____

E-mail Address: _____ 362

[ Submit ] — 364

Current Group: alt.blogging — 522

1. Nerdy Blog
   manga-kid — Dec. 20, 2004 7:22pm
   nerdyblog.blogspot.com is the name of my blog it's about anime, computers, and anything else that comes up. Well there's my blog, what's your blog? Read More 2. Hello you all
   ricardo.cezar@gmail.com - Aug 18 2004, 12:56 pm
   Hello, I'm from Brazil. My blog is in Brazilian Portuguese. Read More 3. Hello yall, check this out
   dl1618@hotmail.com — Dec. 23, 2004 9:59pm
   Free quick easy money period! ...Comments HOW TO TURN $6 INTO $6,000!!!!!! READING THIS COULD CHANGE YOUR LIFE! Read More Browse Groups Recently Visited:
alt.entertainment
alt.ultrawideband
alt.lordoftherings

FIG. 5B

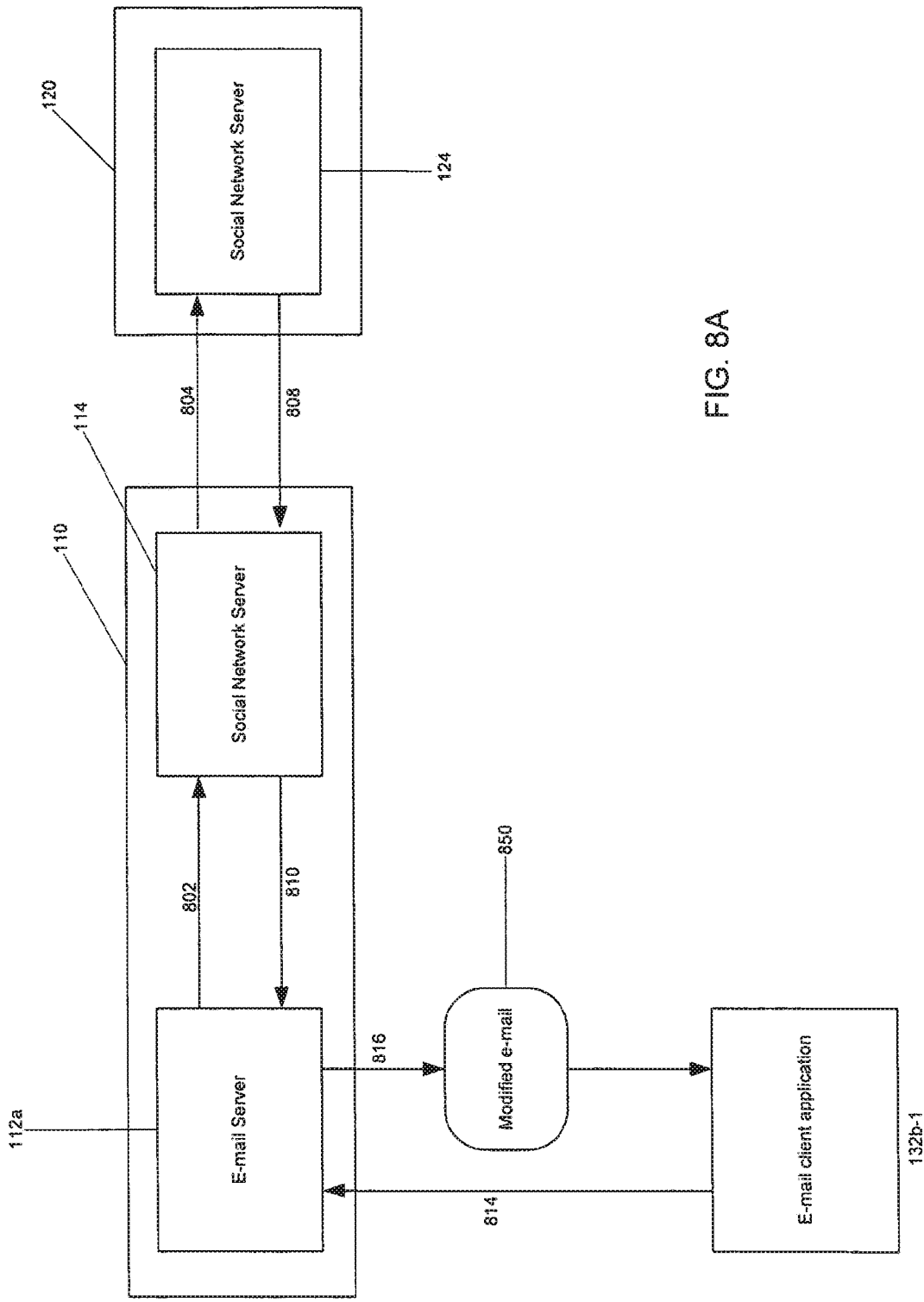

SHARING SOCIAL NETWORK INFORMATION

CROSS REFERENCE TO RELATED APPLICATIONS

This application claims the benefit of U.S. Provisional Application No. 60/552,718, filed Mar. 15, 2004.

TECHNICAL FIELD

This application is a continuation of U.S. patent application Ser. No. 14/330,897, filed on Jul. 14, 2014, which is a continuation of U.S. patent application Ser. No. 13/967,138, filed Aug. 14, 2013 (now, U.S. Pat. No. 8,812,407, issued Aug. 19, 2014), which is a continuation of U.S. patent application Ser. No. 11/079,522, filed Mar. 15, 2005 (now, U.S. Pat. No. 8,538,895, issued Sep. 17, 2013), which claims the benefit of priority to U.S. Provisional Application No. 60/552,718, filed Mar. 15, 2004, all of which are hereby incorporated herein by reference in their entirety.

BACKGROUND

Users of an online service provider who do not have a direct relationship to one another may nevertheless be linked to one another through intermediate entities based on a personal, business or other relationship among the users and the intermediate entities. For example, a user A may have a friend, user B, who also uses that same online service provider and who has a business relationship with user C who also uses the same online service provider. Thus, user A is linked to user C through user B. Such interpersonal interactions or relationships may generally be referred to as a social network. The number of intermediate entities needed to link one entity/user to another may generally be referred to as the degrees of separation between those two entities/users. The social network may be tracked and maintained by the online service provider. The online service provider may generate a social network by observing which users communicate with one another, may build it from user created contact lists or address books, or may ask the users to explicitly create their networks. Social networks may also provide a mechanism for tracking online reputations, and help the users estimate how much to trust one another.

SUMMARY

In general, social network information may be shared across online service providers. Thus, for instance, one online service provider M that maintains a membership separate from a second online service provider N may nevertheless use the social network maintained by the second online service provider N to tailor content and/or services based on such social network information.

Accordingly, in one aspect, social network information from a first online service provider network may be used to modify content or services provided by a second online service provider network. A request for social network information related to a user is sent to a first online service provider network. The social network information related to the user is received and content or services provided by the second online service provider network are modified based on the social network information.

Implementations of this aspect may include one or more of the following features. For example, a social network id associated with a username for the user at the first online service provider network may be received and the request for the social network information may include the social network id. The first online service provider network then may determine the social network information related to the user based on this social network id.

Similarly, a social network id associated with a username for a second user at the first online service provider may be received as part of a web page provided by the second online service provider network. The social network id may be associated with content in the web page added by the second user or contact information for the second user in the web page. The request for social network information related to the user may include this social network id and a username for the user at the first online service provider network. The first online service provider network then may determine the social network information related to the user based on the social network id and the username of the user. The web page then may be modified based on the social network information.

Modifying the web page may include highlighting or changing the position of the content added to the web page by the second user and/or highlighting the contact information for the second user in the web page. The web page may be modified based on the degrees of separation between the user and the second user. For instance, modifying the web page may additionally or alternatively include displaying a visual cue in proximity to the content added to the web page by the second user, or the contact information for the second user in the web page, where the visual cue indicates the number of degrees of separation between the user and the user requesting the web page. Similarly, modifying the web page may alternatively or additionally include changing the position of the content added to the web page by the second user based on the number of degrees of separation between the user and the second user.

Reputation information for the second user may be used to modify the web page or other content or services. For instance, the social network information may include a value representing a reputation of the second user among members of a social network including the user. The web page then may be modified, for example, by displaying a visual cue that indicates the value of the reputation for the second user, and/or by changing the position of the content added to the web page by the second user based on the value representing the reputation of the second user.

An application, for example, may log into the first online service provider network under a username for the user established at the first online service provider network. The username and an identifier of a server, for example, a web server on the second online service provider network, may be sent to the first online service provider network by the application. The first online service provider network may generate a social network id based on the username and identifier and associates the social network id with the username. The application then may receive the social network id from the first online service provider network and sending the social network id to the server on the second online service provider network. That server then may associate the social network id with an account for the user maintained by the second online service provider.

The second online service provider network may maintain a first social network having members including the user. In addition, the social network information received from the first online service provider network may include information regarding members of a second social network that includes the user maintained by the first online service provider network. The members of the first social network may be linked to members of the second social network using the received information regarding members of the first social network.

The user may be one, for example, that has requested the content or services provided by the second online service provider network, that has added content to the content or content or services provided by the second online service provider network, or that is a user whose contact information is display in the content or services provided by the second online service provider.

In another aspect, a social network server maintained on a online service provider network includes a processor and memory that stores instructions for causing the processor to perform particular operations. As a result of those instructions, the social network server may maintain data indicating one or more social networks for members of the online service provider network. The social network server also may receive a request from a system that is separate from the online service provider network for social network information related to a user. The social network server may determine the social network information related to the user based on the data indicating one or more social network maps and make the determined social network information related to the user accessible to the system that is separate from the online service provider network.

Implementations of this aspect may include one or more of the following features. For instance, the system that is separate from the online service provider network may be a client system or a server maintained on a second online service provider network. The social network server may receive, from the system that is separate form the online service provider network, a request for a social network id for the user, generate a social network id for the user, associate the social network id with a username, and send the generated social network id to the system that is separate from the online service provider network.

The request for the social network id may include the username and an identification of a server maintained on a second online service provider network. The social network server may generate the social network id based on the username and the identification of the server maintained on the second online service provider network. A request for social network information may include the social network id and the social network id may be used with the data indicating the one or more social networks to determine the social network information.

Implementations of the techniques discussed herein may include hardware, a method or process, or computer software on a computer-accessible medium. The details of one or more implementations are set forth in the accompanying drawings and the description below.

Other features will be apparent from the description and drawings, and from the claims.

DESCRIPTION OF DRAWINGS

FIGS. 3A-3D, collectively, show the communications and a process that may be performed when a user registers with the web server of FIG. 1.

FIGS. 5A-6C show various ways in which a web page may be modified according to social network information.

FIGS. 8A-8B, collectively, show another implementation that permits a third party service provider network to maintain a social network for the members of the third online service provider network.

DETAILED DESCRIPTION

Figure 1:
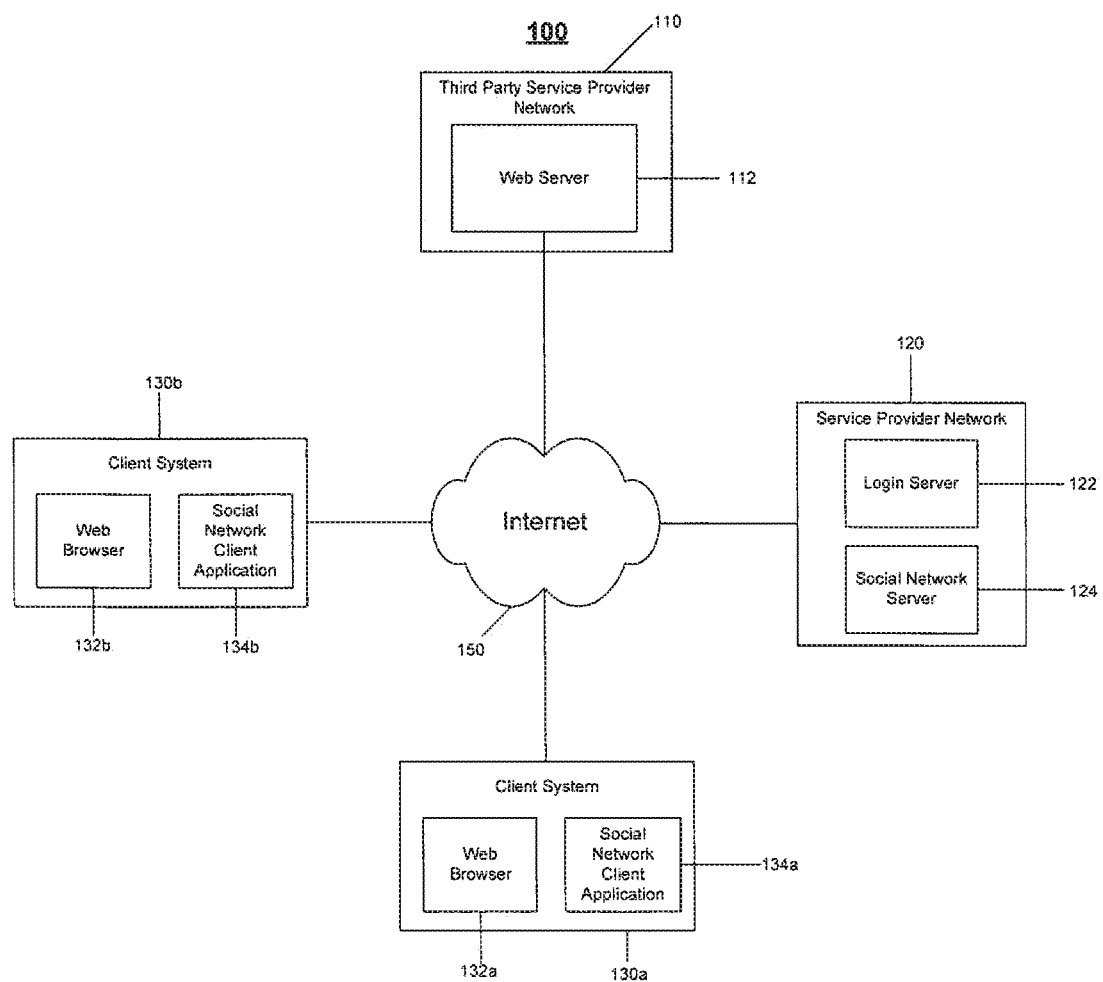
FIG. 1 is a block diagram of an example of a networked computing environment in which social network information may be shared between online service providers.

The techniques described in this document may allow social network information to be shared across online service providers. Thus, one online service provider M that maintains a membership separate from a second online service provider N may nevertheless use the social network maintained by the second online service provider N to tailor content and/or services based on such social network information.

Generally, the terms "member," "user," and "entity" are used interchangeably throughout this description. These terms, however, should not be seen as limited to a person. For example, an organization, such as a corporation, also may use the services provided by an online service provider. Consequently, these terms should be seen as encompassing any entity, actual, legal, or otherwise, that uses a service provider network.

In general, entities may be members of an online service provider. The online service provider may maintain a network that provides its members with content and/or one or more communication services, such as chat, instant messaging (IM), e-mail, message boards, and member directories. An entity may use a client application to connect to the online service provider's network through a global network such as the Internet and to logon to the online service provider's network by providing a screenname (otherwise referred to as a username) and password that have previously been established with the online service provider. Once the entity is authenticated, the client application may be used by the entity to access the content and communication services provided by the online service provider's network. The communication services may allow the entity to communicate with other members of the online service provider. The online service provider may provide access to different communications services depending on a level of access granted to the entity and/or based on the client application used by the entity to connect to the online service provider's network.

America Online, Inc. of Dulles, Va. is an example of an online service provider that maintains an online service provider network. America Online® allows entities who subscribe to the America Online® service to connect to the America Online® network using the AOL® client application. These entities are then able to access the proprietary content and communication services provided by the America Online® network. Some of the content and communication services (for example, message boards) are only available to entities who subscribe to the America Online® service and who connect to the America Online® network using the AOL® client application. America Online® also provides instant messaging services to entities, regardless of whether they subscribe to the America Online® service, through the AOL instant messaging (AIM®) client application. An entity may use the AIM® client application to connect to the America Online® network and to use the instant messaging services provided by the America Online® network. More generally, an online service provider network refers to one or more servers that provide some online service or content that users register to use or view.

Members of an online service provider may use the online service to maintain user contact lists (e.g., address books or instant messaging contact lists). For example, the AIM® client application allows a user to maintain a contact list (referred to as a Buddy List®) that includes the screennames of the entities to whom the user of the AIM® client desires to send instant messages.

Such contact lists may be evaluated to determine the links and the degrees of separation between two entities. For example, entity A may list entity B in entity A's instant messaging contact list, entity B may list entity C in entity B's instant messaging contact list, and entity C may list entity D in entity C's instant messaging contact list. Here, entity B is zero degrees of separation away from A (that is, there are no intermediate nodes between them). Entity C is one degree of separation away from A (they are separated by B). Entity D is two degrees of separation away from A (they are linked via entities B and C).

The online service provider may automatically map a first entity's social network (e.g., the entire social network or up to a designated number of degrees of separation), for example, by evaluating the first entity's contact list(s) and then successively evaluating the contact list(s) of those entities listed in the first entity's contact list until the desired number of degrees have been reached or until the entire network has been mapped. For example, entity A may list entities B and C in entity A's instant messaging contact list. A system may evaluate and determine that entities B and C are so listed and construct a social network map that indicates that entities B and C are linked to entity A. The online service provider may then evaluate the contact lists of entities B and C to determine the entities to which entities B and C are linked. For example, the system may determine that entity B's instant messaging contact list includes entities D and E, and, consequently, that B is linked to D and E. The system then may refine the social network map to indicate that A is linked directly to B and C and is also linked to D and E through B. The online service provider may additionally or alternatively use other techniques to map a social network. For example, the online service provider may observe which users communicate with one another and/or may ask the users to explicitly create their networks The online service provider may store such information about its members as a social network map, graph, or list. The online service provider may make such social network information available to third party service provider networks (i.e., networks of one or more servers that provide content or services separate from those provided by the online service provider, such as, for example, a web server that is separate from the online service provider's network).

For example, in one implementation, a client system may execute a social network client application that logs into the online service provider's network. The client system also may execute a web browser that requests a web page from a third party web server. The web page may include social network display code. The social network display code may communicate with the social network client application to request social network information regarding the user of the client system. The social network client application then may use an application programming interface to retrieve social network information for the user of the client system from a social network server on the online service provider network. The social network client application then returns the social network information to the social network display code of the web page, which modifies the web page based on the social network information. Thus, the web page, for example, can be modified based upon the social network relationship between the viewer of the web page and the creator of content in the web page, or the user corresponding to contact information displayed in the web page content.

For instance, if the web page provides newsgroup posts, or other content that is added by users of the website, the social network display code may change the order of the posts based on the social network information. The social network display code may, for instance, move posts added by the users in the client system user's social network to the top of the web page and/or may order them based on the number of degrees of separation between the user who added the post and the client system user. The social network code may alternatively or additionally order the posts based on the posting user's reputation in the social network of the client system user. Ordering or otherwise changing the position of added content on a web page based on the social network information may, for example, help alleviate problems related to spam content or posts.

As another example, a visual cue may be displayed to an entity viewing contact or other information displayed on a web page to represent another entity. The visual cue may directly indicate the degrees of separation between the entity whose contact information is displayed and the entity who is viewing the contact information, may display the pathway between the two, and/or indicate reputation information. For example, if a potential buyer A is reading a post by a seller B (where the post displays seller B's contact information) on an online auction site (such as the online auction provided by eBay Inc. of San Jose, Calif.), and buyer A is linked to seller B by six degrees of separation, then a visual cue may be displayed in association with seller B's contact information to indicate to buyer A that entities A and B are linked and separated by six degrees of separation. The visual cue may alternatively or additionally indicate whether members of user A's social network have marked user B with a positive or negative reputation.

Similarly, if a job hunter A is reading a post by an employer B (where the post displays entity B's contact information) on an employment website, and the job hunter A and employer B are separated by three degrees of separation, a visual cue may indicate that they are separated by three degrees and may additionally or alternatively indicate the path between the two. Providing such information may make a buyer more comfortable buying from the seller, in the case of an online auction, or, in the case of the employment website, may provide information about contacts that can be leveraged by the job hunter to obtain employment with the employer or help the employer determine whether to hire the job seeker.

FIG. 1 shows an example of a networked computing environment 100 in which social network information maintained by one online service provider network 120 may be made available to modify the content and/or services provided by a third party online service provider network 110. Computing environment 100 includes client systems 130*a* and 130b, service provider network 120, and a third party service provider network 110 interconnected by a network 150, such as the Internet.

Service provider network 120 may be one like the network provided by America Online®. However, as described above, an online service provider network more generally refers to one or more servers that provide some online service or content that users register to use or view. For example, social network websites, such as the ones provided by Tribe Networks, Inc. of San Francisco, Calif. (located at www.tribe.net) and LinkedIn Corporation of Palo Alto, Calif. (located at www.linkedin.com), may be referred to as online service provider networks. Users register with these websites to obtain a username and password, which the users then use to log onto these websites to access the social network services provided by these websites. As another example, some websites (such as web logs or websites that provide access to newsgroups or forums) allow users to post comments or other content. Before such websites allow users to post content, the websites typically require users to register with the website to obtain credentials, such as a username and password, which the user then uses to log into the website and post content.

Service provider network 120 includes a login server 122 that allows a client application to log into service provider network 120 using, for example, a screenname and password. The screenname or username used to log into service provider network 120 is referred to as a service provider username. Once the client application is authenticated and logged into the service provider network by login server 122, the client application can then access some or all of the services or content provided by service provider network 120. Service provider network 120 also includes a social network server 124 that determines the social network map(s) or list(s) for members of online service provider network 120 and makes such social network information available for use in modifying a third party provider's content or services, as described further below.

Client systems 130a and 130b each include, respectively, a web browser 132a or 132b and a social network client application 134a or 134b. Social network client applications 134a and 134b log into the service provider network 120 using the client system users' credentials and act as intermediaries to obtain social network information for the client system users, as described further below. The social network client applications 134a and 134b may be client applications, such as an instant messaging client or an online service provider client like the AOL® client, used by users to access services or content provided by the service provider network 120. Alternatively, social network client applications 134a and 134b may be applications that simply act as intermediaries to obtain the social network information. Social network client applications 134a and 134b may be plug-ins for web browsers 132a and 132b or other applications, or they may be stand-alone applications or services on client systems 130a and 130b that may or may not have a user interface.

From the standpoint of the online service provider network 120, network 110 is a third party service provider network(i.e., it provides content and/or services that are not part of service provider network 120). In this example, third party service provider network 110 includes a web server 112. Web server 112 provides web pages, for example, to web browsers 132a or 132b. The web pages provide content or services that can be viewed or used by the users of client systems 130a and 130b. As further described below, while illustrated as including a web server 112, other implementations of third party service provider network 110 may, in addition or as an alternative to web server 112, include other types of servers that provide content or services, which may or may not be accessed by client applications other than web browsers 132a and 132b. For example, the third party service provider network 110 may include an e-mail server that provides e-mail service that is accessed by an e-mail client, or an instant messaging server that provides instant messaging service to an instant messaging client. Third party online service provider network 110 may be a network similar to the AOL® network. Third party online service provider 110 may maintain its own social network for the members of third party service provider network 110.

To obtain the content or services from third party service provider network 110, a user, such as the user of client system 130a, first registers with web server 112 to establish a username (which is referred to as a third-party username and may be different from the service provider username that is established for service provider network 120) and a password. The username and password are then used by the user of client system 130a to log onto web server 112 and access the content or services. As described more fully below, in one implementation, the web page that is used by the user of client system 130a to register with the web site contains code, such as javascript, that communicates with social network client application 134a to obtain a unique id from social network server 124. The unique id is associated with the service provider username. This unique id is then returned to web server 112 when the user completes the registration and is associated with the user's account information (including the third-party username) stored by web server 112. Thus, for this user, web server 112 now stores both a third party username and a unique id provided by social network server 124. Then, when the user's third party username or other contact information is displayed in a web page, or content is posted to a web page by the user, the unique id is associated with the contact information or content displayed in the web page.

When a second user, such as the user of client system 130b using web browser 132b, subsequently requests a web page that contains the contact information or content created by the user of system 130a, the associated unique id for the user of system 130a is provided along with that contact information and/or content. The web page provided by web server 112 also includes code, such as javascript, that communicates the unique id to social network client application 134b, which uses the unique id (which is associated with the service provider username of the user of client system 130a) and the service provider username of the user of client system 130b to obtain social network information from social network server 124 regarding the relationship between the user of client system 130a and the user of client system 130b. The code uses this social network information to modify the display of the web page. For instance, if the user of client system 130a is in the social network of the user of client system 130b, the content posted by the user of client system 130a is identified by the associated unique id and may be highlighted or moved to the top of the web page.

Each of the client systems 130a and 130b, web server 112, login server 122, and social network server 124 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 130a and 130b, web server 112, login server 122, and social network server 124 may receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to client systems 130$a$ and 130$b$, web server 112, login server 122, or social network server 124.

Network 150 may include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network. Network 150 may include multiple networks or subnetworks, each of which may include, for example, a wired or wireless data pathway.

Figure 2A:
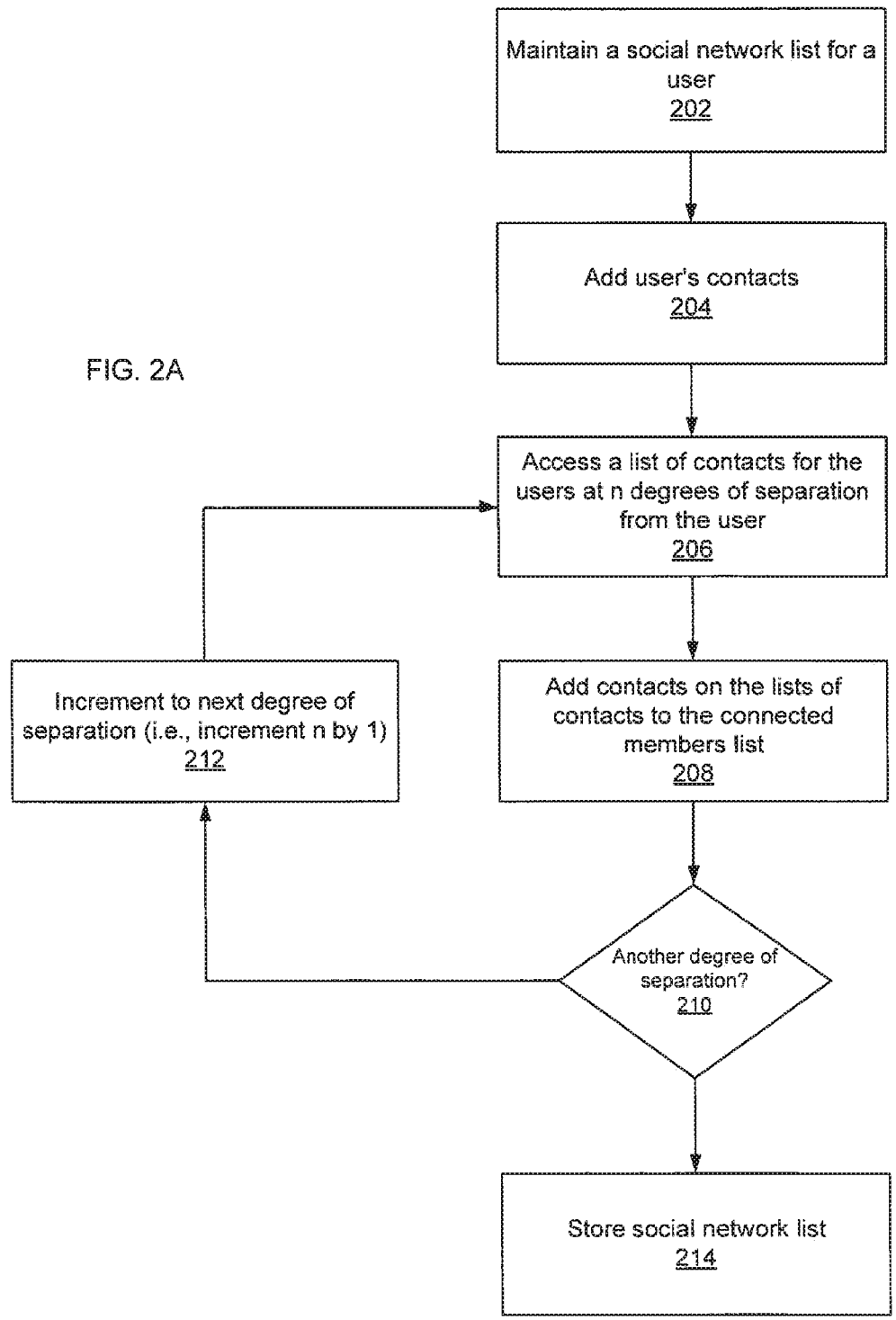
FIG. 2A is a flowchart showing a process for determining a user's social network.

FIG. 2A is a flow chart showing a process 200, which may be performed, for example, by social network server 124, to determine a user's social network. A social network list is maintained for the user (202). The contacts in one or more of the user's contact lists (e.g., the user's instant messaging contact list) are added to the social network list with an indication that the contacts are zero degrees of separation from the user (and, therefore, are directly linked to the user) (204).

Next, the contacts linked to the user through the user's contacts in the contact list (e.g., up to a desired degree of separation) are identified and added to the social network list. To do so, the contact lists of each contact in the user's contact list are accessed (206). The contacts in those lists (i.e., the contacts separated by one degree) then are added to the social network list (208). If another degree of separation is desired (210), the degree of separation is incremented (212) such that the contact lists of the contacts that are separated from the recipient by one degree are accessed (206) and the contacts in those contact lists are added to the social network list (208).

When a contact is added to the social network list, the contact's degree of separation from the user also is added and, in addition, the contact that links the user to the added contact may be stored so that an indication can be provided of the path between the user and the added contact. The addition of contacts continues until the desired degree of separation is reached, at which point the social network list is stored for later use (214).

The above process can be modified in a number of ways. For example, at times it may be desirable to have greater assurance that a relationship actually exists between two users before indicating that the two users are directly linked. That is, the before a first user is included in a social network, it may be desirable to have greater assurance that there is a relationship between the first user and a second user which connects the first user to the social network. In particular implementations, such assurance can be obtained by requiring that two entities list each other in their respective contact lists before the entities are considered as having a relationship (and, therefore, are directly linked). In such implementations, an increased likelihood of a relationship between two users is assumed to exist when the two users list each other in their respective contact lists. Thus, for example, before a second user listed in a first user's contact list is added to the first user's social network list, the second user's contact list may be accessed to determine if the first user is listed in the second user's contact list. If such a bidirectional link exists, then the second user is added to the first user's social network list.

The contact lists used to develop the social network list or otherwise used to map a social network may be stored centrally or in a distributed fashion. For example, the techniques may be applied to an environment in which all of the users' contact lists are stored on a single server (completely centralized), or on a single cluster of servers owned by the service provider (partially centralized/distributed). The contact lists may be stored in a more fully distributed fashion by being stored on each client system (i.e., each user's contact list is stored on the user's client system). The contact lists may then be accessed by social network server 124 when social network client application 134$a$ or 134$b$ is logged into service provider network 122 and temporarily or permanently stored by social network server 124 to develop the social network lists.

Figure 2B:
FIG. 2B is a diagram showing an example of a social network list.
Figure 2C:
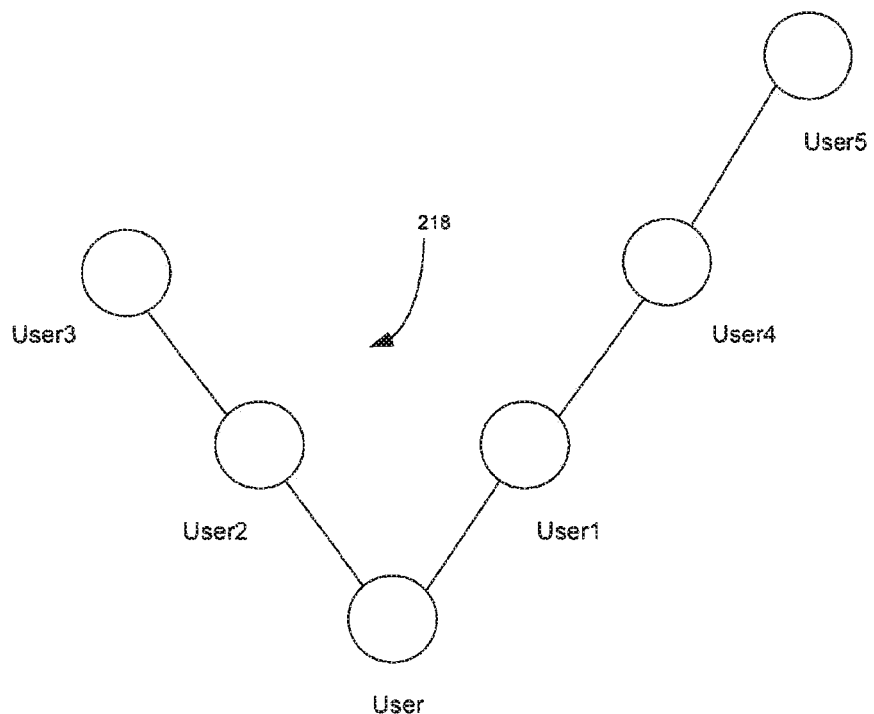
FIG. 2C is a diagram showing the social network corresponding to FIG. 2B in graphical form.

FIG. 2B shows an example of a social network list 216, while FIG. 2C shows the corresponding exemplary social network 218 in graphical form. Social network 218 is for an entity designated as User. User is directly linked to User1 and User2 (User may, for example, have User1 and User2 in User's address book). User1 is linked to User4, while User2 is linked to User3. Consequently, User is linked to User3 (through User2) and User4 (through User1) through one degree of separation. Similarly, User4 is linked to User5 and, consequently, User is linked to User5 (through User 4 and User1) through two degrees of separation.

Social network list 216 for User contains indications of the entities to which User is linked, the degrees of separation between User and the linked entities, and the entities linking the linked entity to the social network 218. For instance, an indication of User5 is included, along with an indication that User5 is two degrees of separation from User. There also is an indication that User4 is the entity that links User5 to social network 218 (and, hence, User). Including the entity linking a particular entity to the social network allows the structure of the social network to be determined from the social network list. As an alternative, the entity linking a particular entity to the social network may be excluded. For instance, the social network list may only contain an indication of the entity and its degrees of separation. The social network may alternatively or additionally contain more detailed information about the relationships between the users, such as the degree to which particular users trust or distrust other particular users and/or and indication of the strength of the links between users.

While the process described with respect to FIG. 2A determines existing social networks, from, for example, contact lists, other ways of forming, determining, or tracking social networks may alternatively or additionally be used. For instance, instead of determining existing social networks, the online service provider may provide tools to users so that they can positively create social networks for use with the social network websites described above. For instance, the online service provider may support an invite-accept model for forming social networks. In an invite-accept model, to become part of a social network, a user receives an invitation from another user to join the social network (i.e., to be linked to the other user). When the user accepts the invitation, he or she is linked to the other user, and hence, the social network. The online service provider then may use social network lists or other techniques to track the links between members of the various social networks.

An invite-accept model may be used in conjunction with the techniques described above for determining an existing social network using, for example, contact lists. For instance, the social network list may be constructed using contact lists as described above. Then, as the user receives and accepts invitations to join other social networks, the social network list may be updated to include those directly linked users that the user accepted, and the other users linked at further degrees of separation.

In some implementations, the online service provider may observe the communications between users to determine the social network, or to infer the strength of the links between users. For example, the online service provider may observe that two users communicate using instant messaging, and therefore are linked to one another. The online service provider then may observe the frequency of the users' communication to a determine the "strength" of the link between the two. Users' who communicate more frequently, for instance, may have a link with a higher strength than users that communicate less frequently.

Figure 3A:
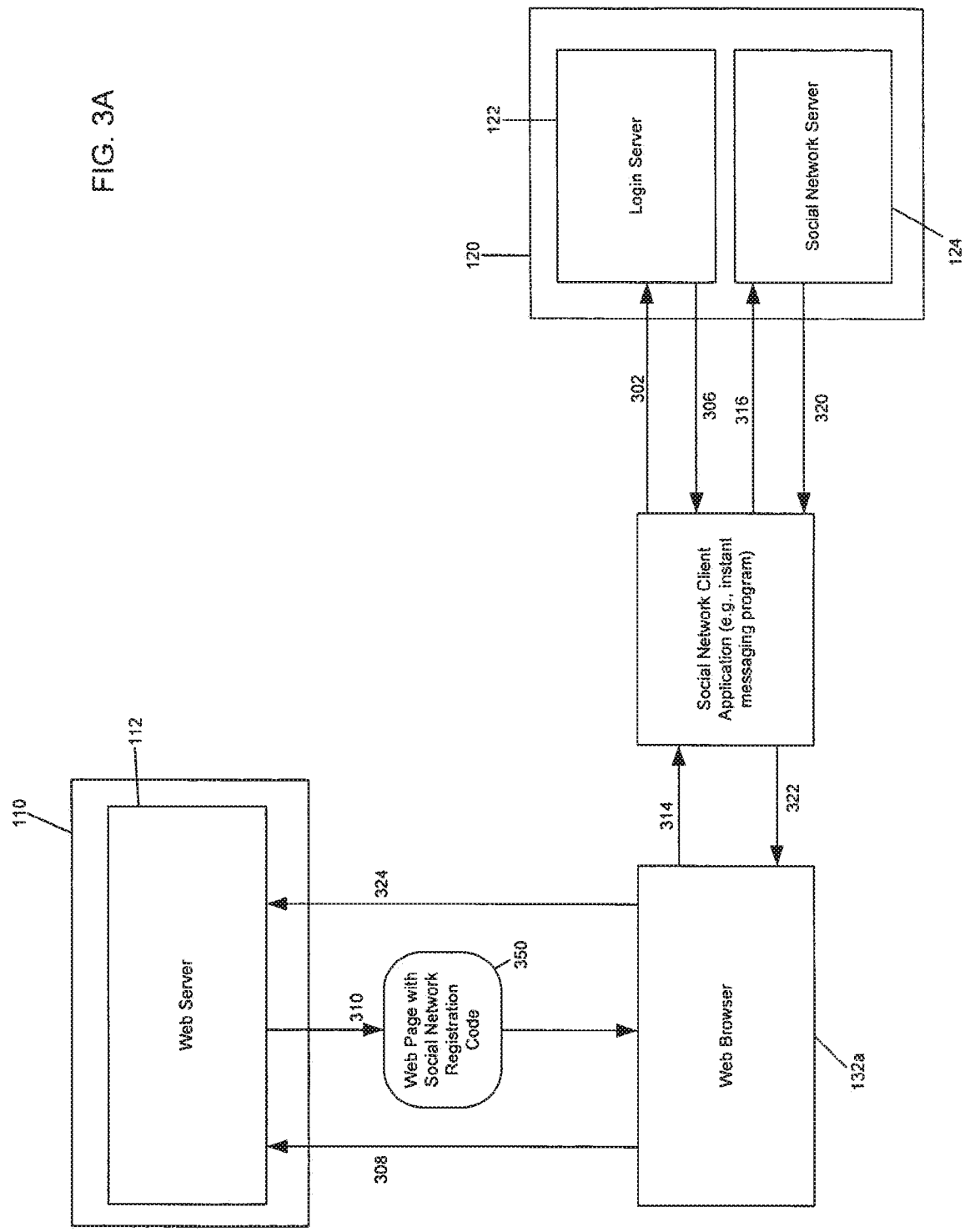
Figure 3B:
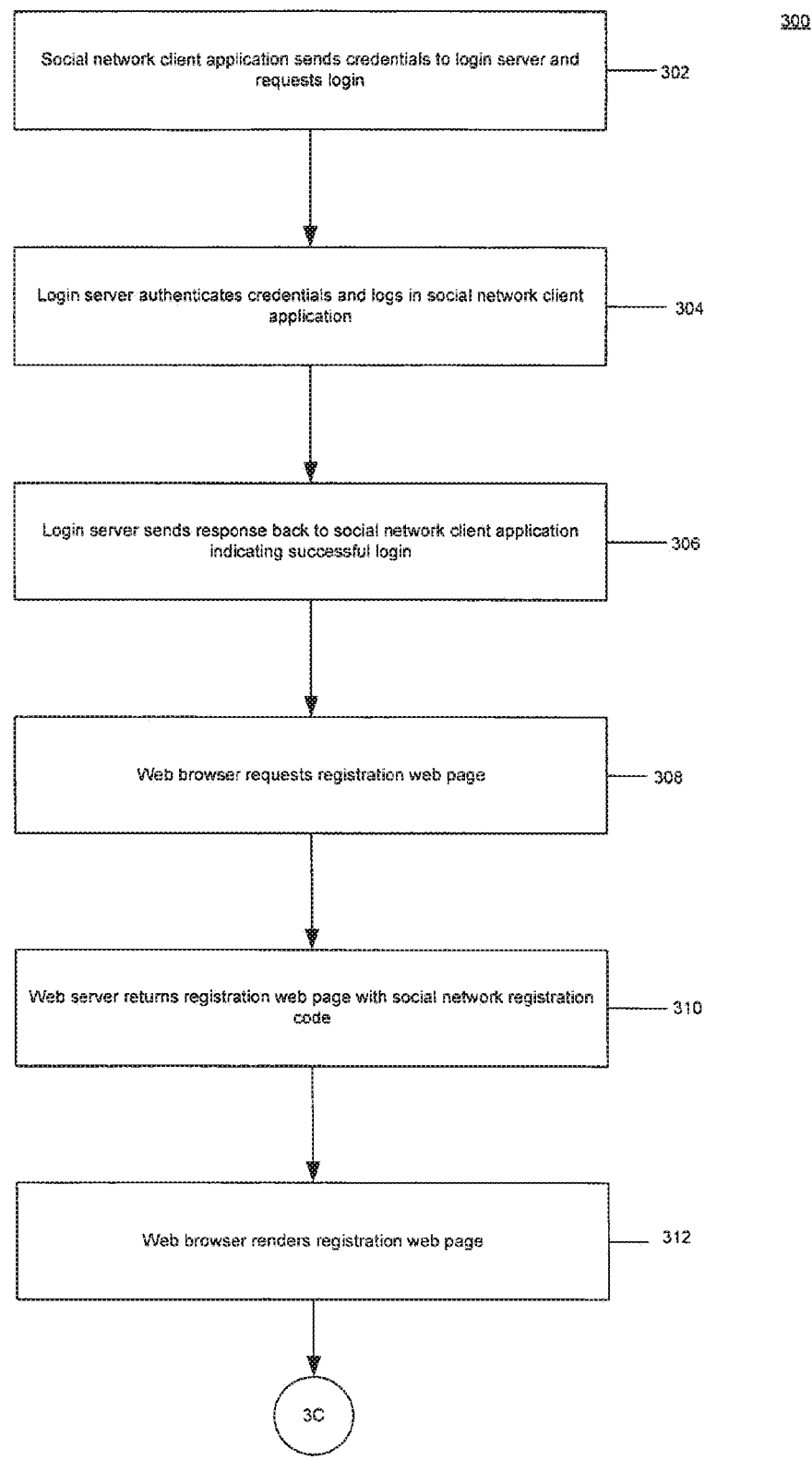
Figure 3C:
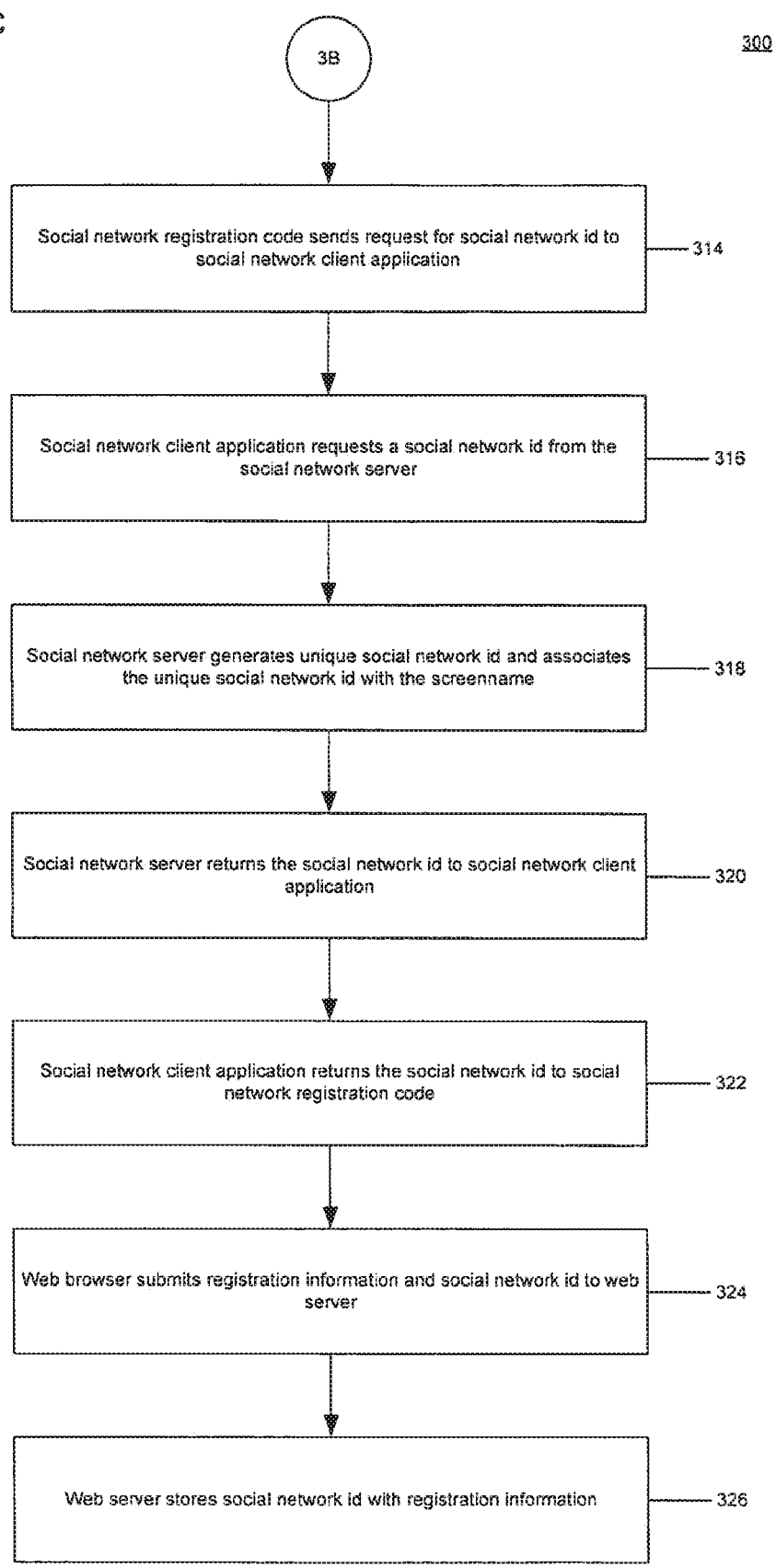

FIGS. 3A-3C, collectively, show an example of communications (FIG. 3A) and a process 300 (FIGS. 3B and 3C) that may be performed by web server 112, web browser 132a, social network client 134a, login server 122, and social network server 124 when the user of client system 130a registers with web server 112. Initially, social network client application 134a sends the user's credentials (e.g., a service provider username and password) to login server 122 and requests that the social network application 134a be logged into service provider network 120 (302). For example, if the social network client application 134a is an instant messaging application, the user may invoke the instant messaging application and provide the service provider username and password to the instant messaging application using an interface of the instant messaging application. This may be performed by the user in anticipation of registering with web server 112 or may be performed simply to use the instant messaging application to engage in instant messaging with other users. As described above, social network application 134a may, alternatively or additionally, be implemented as a plug-in for web browser 132a. In such a case, social network client application 134a may be invoked when web browser 132a is invoked.

Login server 122 then authenticates the credentials and, assuming the credentials are authentic, logs social network client application 134a into service provider network 120 (304). Once login server 122 logs in social network client application 134a, login server 122 sends a response back to social network client application 134a indicating that the login was successful (306).

Figure 5A:
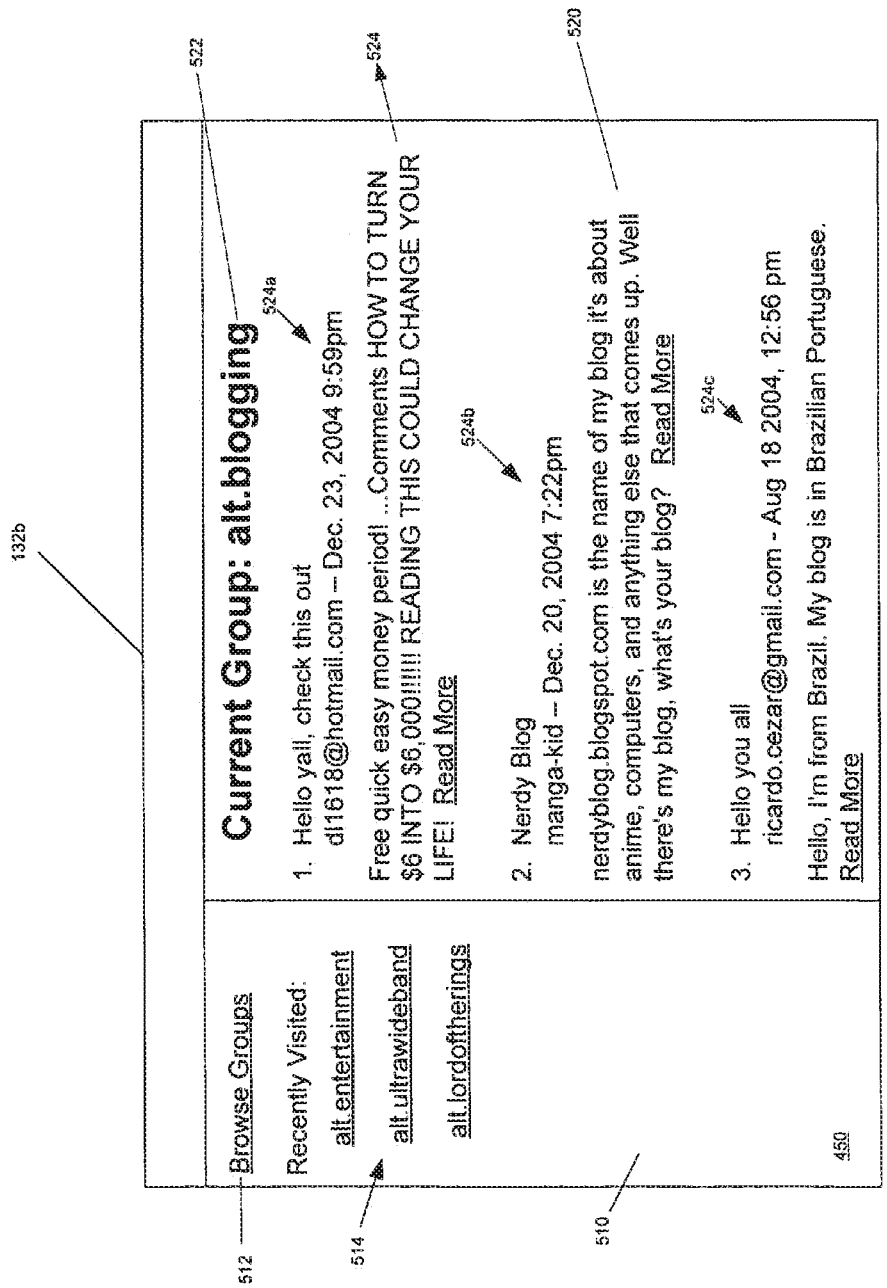

Web browser 132a then requests the registration page (an example is shown in FIG. 5A) from web server 112 (308). Web server 112 returns the registration web page 350 (which includes social network registration code) to web browser 132a (310), which renders the registration web page (312).

Referring to FIG. 3D, web page 350 may include a mechanism, such as a checkbox 352, that allows the user of client system 130a to indicate that his or her social network information maintained by service provider network 120 should be associated with the account on web server 112. Web page 350 also includes text fields 354 and 356 that allow the user to enter his or her name, text boxes 358 and 360 that allow the user to establish a third party username and password by entering them into text boxes 358 and 360, respectively, and a text box 362 that allows the user to enter his or her e-mail address. Once the user has entered this information, he or she may select "submit" button 364 to complete registration by sending this registration information to web server 112.

The social network registration code is executed when the user indicates that the social network information should be associated with the account on web server 112, for example, by selecting checkbox 352. The social network registration code may be implemented in, for example, javascript or another scripting language supported by web browser 132b, or may be implemented, for example, as an ActiveX control or Java applet.

Referring again to FIGS. 3A-3C, when executed, the social network registration code passes a request for a social network id to social network client application 134a (314). The social network registration code may pass the request, for example, using an interprocess communication protocol. Alternatively, social network client application 134b may implement a server, such as a web server, that listens at a specified port on client system 130b. In such a case, the social network registration code may pass the request to the server by sending a hypertext transfer protocol (HTTP) or other protocol request to the server at the open port.

The request passed to social network client application 134a may include a unique identifier for web server 112, such as the uniform resource locator (URL) for web server 112. Social network client application 134a then requests a social network id from social network server 124 (316). To do so, social network client application 134a may send to social network server 124 the unique identifier for web server 112 and the service provider username used by social network client application 124 to log onto service provider network 120. Social network client application 124 may do so, for example, by using an application programming interface (API) provided for social network server 124. The API may implement a function similar to the following: getSocialNetworkID (current_username, URL), where current_username is equal to the service provider username used by social network client application 134a to log into service provider network 120 and URL is equal to the unique identifier of web server 112. Social network client application 134a may call such a function to obtain the social network id from social network server 124.

Social network server 124 then generates a unique social network id and associates that social network id with the service provider username used by social network client application 134a to log onto service provider network 120 (318). Social network server 124 may generate a social network id that is unique from other social network ids, and is specific to web server 112. For example, social network server 124 may apply a hash function that generates unique ids to a concatenation of the web server URL and service provider username. Accordingly, if the user of client system 130a visits another web server and associates the social network information with the different web server, a different, unique social network id will be created specifically for that different server and associated with the service provider username. In other words, a particular service provider username may have different social network ids for each different website. This process of having the browser connect from the client via the social network application, may prevent the third party service provider from being able to directly determine the service provider username and may thereby afford the user a measure of security and anonymity. The inclusion of a site identifier to generate the unique social network id may prevent other web sites from copying data in an attempt to spoof the social network.

After generating the social network id, social network server 124 returns the social network id to social network client application 134a (320), which in turn returns the social network id to the social network registration code (322). The social network registration code may, for example, store the social network id in a variable that is returned to web server 112.

As the social network registration code obtains the social network id, the user may enter a username and password for web server 112 (that is, a third party username and password), and provide other registration information, by entering such information into text boxes 354, 356, and 362 on web page 350. The user then may submit this information and complete registration, for example, by selecting submit button 364 on registration web page 350. After the user selects the submit button, web browser 132a submits the information entered into text boxes 354-362, along with the social network id, to web server 112 (324).

Web server 112 then generates an account for the user and stores the registration information in the account, along with the social network id (326). While not shown in FIGS. 3A-3C, when a user subsequently wishes to access content or services provided by web server 112, a login web page is obtained from web server 112 and the user enters his or her third party username and password into the login web page and submits these credentials to web server 112. Once logged in, the user can access the content or services provided by web server 112, such as adding content to web pages or communicating with other users of web server 112.

Figure 4A:
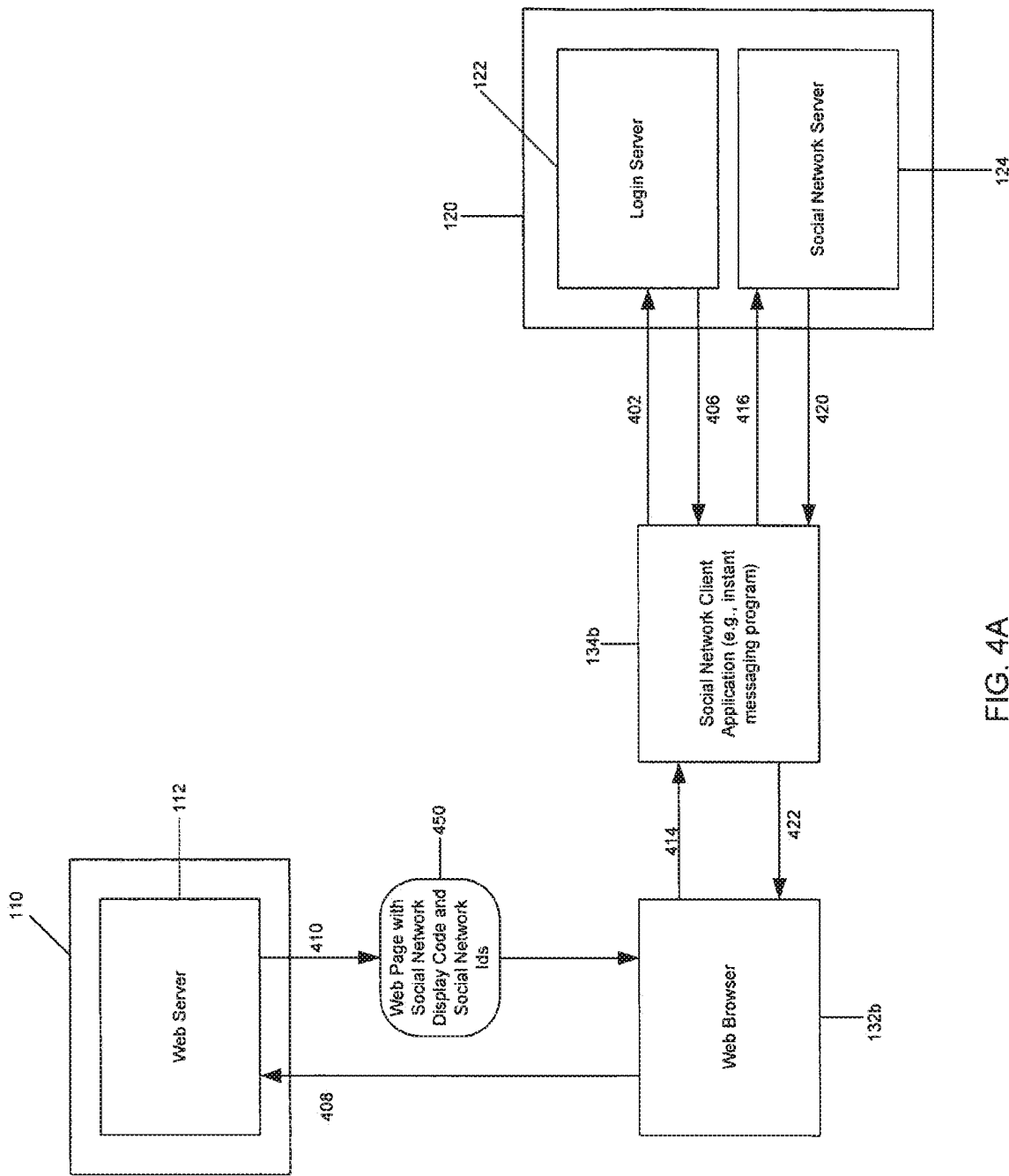
FIGS. 4A-4C, collectively, show the communications and process that may be performed when a user retrieves a web page from the web server of FIG. 1.
Figure 4B:
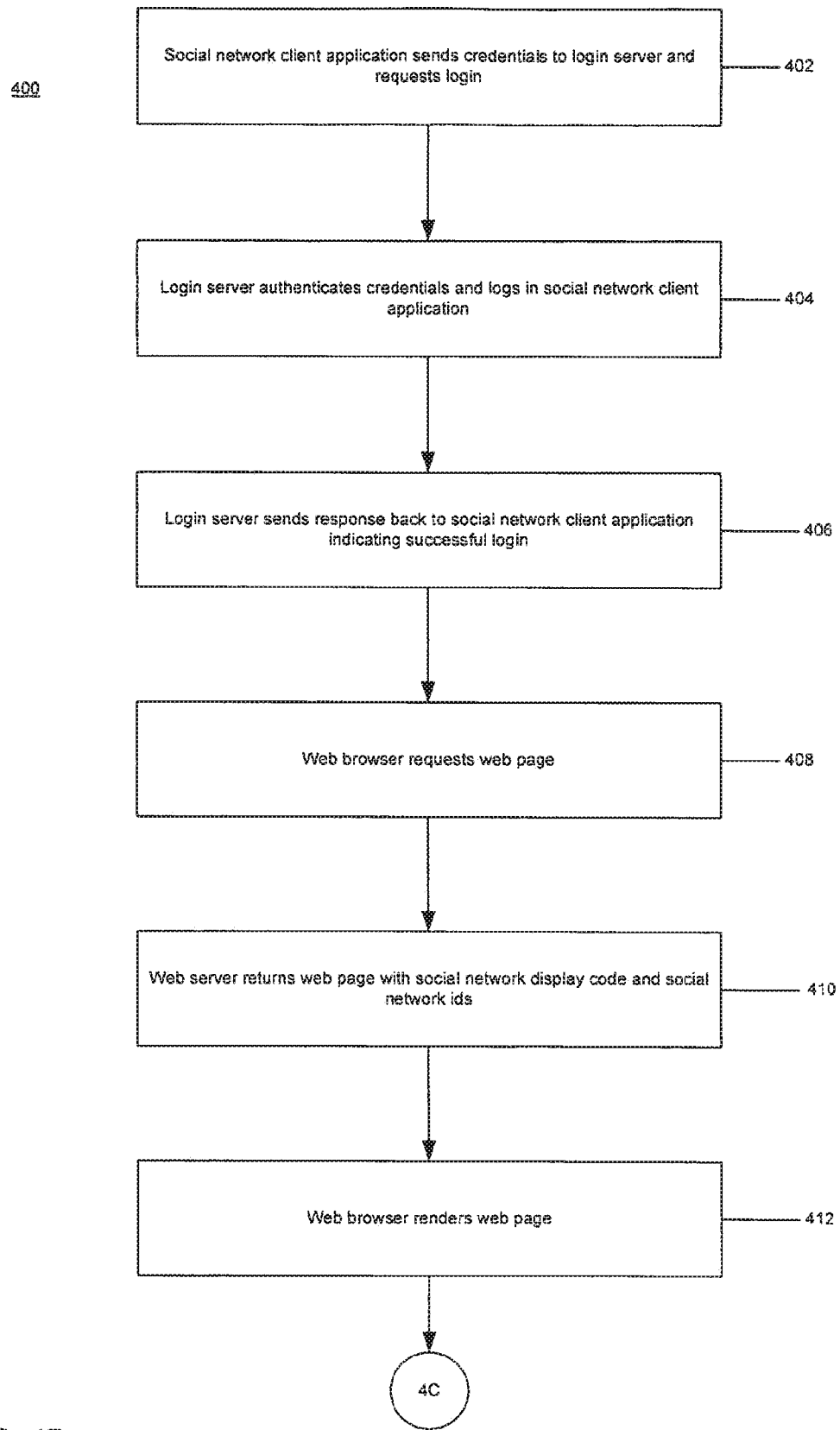
Figure 4C:
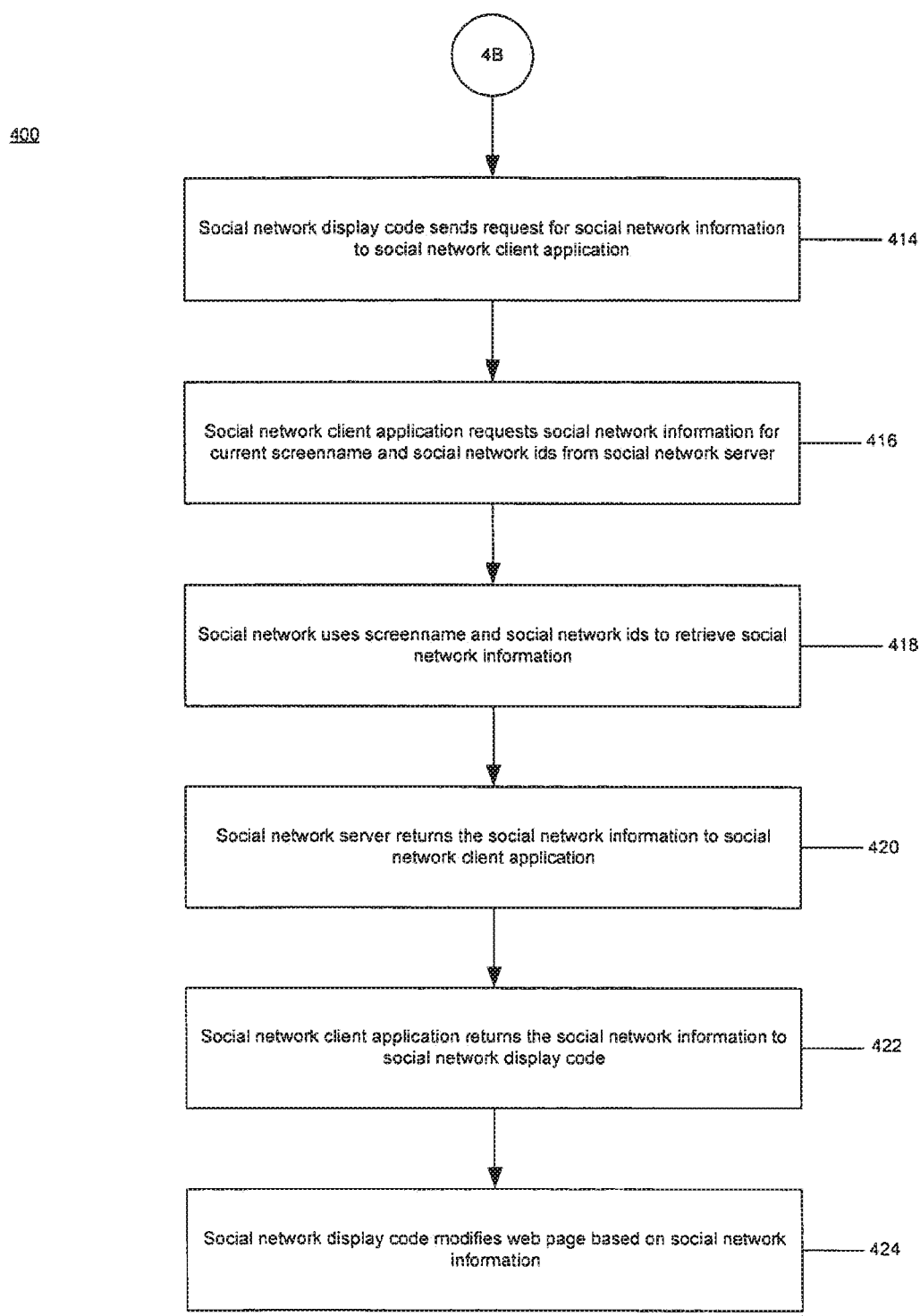

FIGS. 4A-4C, collectively, show an example of communications and a process 400 that may be performed by web server 112, web browser 132b, social network client 134b, login server 122, and social network server 124 when the user of client system 130b retrieves a web page from web server 112. As with process 300, in process 400 social network client application 134b logs into service provider network 120. To do so, social network client application 134b sends the credentials (e.g., a service provider username and password) for the user of client system 130b to login server 122 and requests that the social network application 134b be logged into service provider network 120 (402). Login server 122 then authenticates the credentials and, assuming the credentials are authentic, logs social network client application 134b into service provider network 120 (404) and sends a response back to social network client application 134b indicating that the login was successful (406).

Web browser 132b then requests a web page (examples are shown in FIGS. 6A-7C) from web server 112 (408), and web server 112 returns the web page 450 (410). The web page retrieved may include the username or other contact information for, and/or content added by users, such as the user of client system 132a. For users, such as the user of client system 132a, that have associated their social network information with their account for web server 112, the content added by these users, or the contact information for these users, has the user's corresponding social network id associated with the content or contact information.

Web pages are typically written in the hypertext markup language (HTML) or other markup language such as the extensible markup language (XML). In such languages, tags are used to define how a web browser should display the content of the web page. One method of associating the social network id with content or contact information is to set the "id" attribute of a tag surrounding the added content or contact information equal to the users social network id.

The following is a simple example of a portion of the HTML of a web page using such a technique to associate a social network id with the content added by the corresponding user:

<p id=235678>Hello Everyone!<p>

In this example, the "id" attribute of the <p> tag (which represents a paragraph) is set equal to a social network id of "235678," which, for example, may be the social network id for the user of client system 132a.

In addition to having social network ids associated with added content or contact information, the retrieved web page includes social network display code, which, similarly to the social network registration code, may be implemented, for example, in javascript or another scripting language, or may be implemented, for example as an ActiveX control or Java applet. After web browser 132b receives the web page, web browser 132b begins rendering the web page (412), which executes the social network display code. For example, if javascript is used, then the social network display code may be executed in response to the "onLoad" event.

When executed, the social network registration code passes a request for social network information to social network client application 134b (414). As with the social network registration code, the social network display code may pass the request, for example, using an interprocess communication protocol or by sending a request to server implemented by the social network client application 134b.

The request passed to social network client application 134a includes one or more of the social network ids, and may specify a type of social network information requested, depending on how the web page is to be modified. For example, the social network display code may highlight content added by users within a certain number of degrees of separation, or may modify the page to reflect the degrees of separation. In such a case, only the degrees information needs to be request. Alternatively, or additionally, for example, the social network display code may modify the web page to display the pathway between two users. In such a case, the social network display code may request the path information (i.e., which users connect the two users and how). As another example, the social network display code may highlight contact information for, and/or content created by, users with particularly good reputations. The social network display code may alternatively or additionally hide contact information for, or content created by, users with bad reputations. In another scenario, the social network display code may reorder the content such that content created by users with good reputations is shown first. In such instances, the social network display code may request the reputation information.

Social network client application 134a then requests the social network information from social network server 124 (416). To do so, social network client application 134a may send social network server 124 the social network ids provided by the social network display code, the service provider username used by social network client application 124 to log onto service provider network 120, and other information as necessary. Social network client application 124 may do so, for example, by using an API provided for social network server 124. Depending on the information requested by the social network display code, different types of information may be accessed through the API. For example, the API may have a number of different functions that can be called based on the information requested by the social network display code. For example, the API may have the functions similar to the following:

isDegrees (current_username, site_id, sn_id, degrees), where current_username is a service provider username, site_id uniquely identifies the third party service, sn_id is an array of one or more social network ids, and degrees is a number. This function may return a boolean for each social network id indicating whether the service provider username associated with the social network id and the "current_username" are within the number of degrees of separation specified by "degrees."

getPath (current_username, site_id, sn_id), where current_username is a service provider username, site_id uniquely identifies the third party service, and sn_id is an array of one or more social network ids. This function may return for each social network id an object containing the path between the service provider username associated with the social network id and the "current_username."

getDegrees (current_username, site_id, sn_id), where current_username is a service provider username, site_id uniquely identifies the third party service, and sn_id is an array of one or more social network ids. This function may return for each social network id a number indicating the degrees of separation between the service provider username associated with the social network id and the "current_username."

Thus, depending on the information needed, social client network application 134b may call the appropriate function and pass the service provider username used by social network application 134b to log into the service provider network through the current_username variable, pass the social network ids provided to social network client application 134b by social network display code through the variable sn_id equal, and, if needed, pass a number of degrees of separation requested by social network display code through the variable degrees. The unique site_id identifier may also be passed to social network server 124 in order to verify that the social network ids were actually registered with the site for which the social network code and/or social network client application is requesting information.

Social network server 124 then uses the social network ids to determine the corresponding service provider usernames. Using the determined usernames and the username provided by social network client application 134b, social network server 124 then determines the requested social network information using, for example, a social network list, such as the one shown in FIG. 2B (418).

Social network server 124 then returns the requested social network information to social network client application 134b (420), which in turn returns the requested social network information to the social network display code (422). Based on the requested social network information, the social network client code modifies the display of the web page. To do so, for example, the social network code may access the document object model (DOM) of the web page and modify nodes of the DOM as appropriate to modify the web page based on the social network information. For example, when the "id" attribute in a tag surrounding content added by a user is set to the user's social network id, the social network display code may access the corresponding node using the social network id. After accessing the node, for instance, the social network display code may move the node (thereby changing where the content is displayed on the page). The social network display code may add highlighting or perform other style changes to the node, or a child node that represents the added content.

There are a number of ways a page can be modified based on social network information. For example, as described above, the position of content added to a web page by users may be changed based on the social network information. Thus, for instance, content added by users not in the viewing user's social network may be hidden, or moved towards the bottom of the web page. The content added by users may be ordered on the web page according to the number of degrees of separation between the users and the viewing user, by the social network reputations for the content authors, or based on the link strength between relationships in the social network.

As another example, the added content or contact information of a user may be modified to reflect the social network information. For example, a visual cue may be associated with the content or contact information to indicate the degrees of separation between the viewing user and the author of the content or the user corresponding to the contact information, and/or the reputation of the content author. For instance, an icon may be displayed next to the contact information or content, or a color may be associated with the contact information or content. The color may be associated, for example, by highlighting or changing the color of the contact information (e.g., the second user's screen name or e-mail address) or added content. The color may directly indicate the degrees of separation between the users by corresponding to a particular number of degrees. For instance, green may correspond to one degree of separation, while red corresponds to two degrees of separation. In another case, the color of the icon may represent the reputation of the user to which it is linked. As yet another example, the pathway between the viewing user and the author of the added content or the user corresponding to displayed contact information may be displayed in the web page, or may be displayed in a pop-up web page that is invoked if the contact information or content is selected by the viewing user. Thus, the social network display code may modify the web page to provide a pop-up that displays the pathway when the contact information or content is selected.

As an example of one way in which the social network display code may modify web page 450, FIG. 5A shows web page 450 rendered in browser 132b without being modified, while FIG. 5B shows web page 450 modified according to social networking information. In this example, web page 450 provides access to newsgroups, such as the USENET newsgroups.

Referring to FIG. 5A, web page 450 includes a section 510 that includes a link 512 and links 514. Selecting link 512 retrieves a web page that allows the user to browse the various newsgroups and select one newsgroup to view the posts to that newsgroup. Links 514 reflect recently viewed newsgroups and, when one of links 514 is selected, the corresponding newsgroup is displayed.

Web page 450 also includes a section 520 that displays headers 524 for posts to the currently selected newsgroup. A title 522 displays the name of the currently selected newsgroup.

There are three headers 524 shown, header 524a, 524b, and 524c. Header 524a is listed first (at the top), header 524b is listed second, and header 524 is listed last (at the bottom). Headers 524 display some information about each post, such as, for example, a title for the post, the username or e-mail address of the user who added the post, and a brief synopsis of the post. Headers 524 also include a link to view the entire post. For example, header 524a displays the title "Hello yall, check this out," the e-mail address dl1618@hotmail.com, the synopsis that starts with "Free quick easy money period," and a hyperlink "Read More" that allows the user to view the entire post.

FIG. 5B shows a version of web page 450 that is modified by the social network display code to reorder the headers 524 based on the degrees of separation between the user viewing headers 524 (for example, the user of client system 130b) and the users who added the posts corresponding to headers 524. In this example, the user of client system 130b is connected to the user who added the post corresponding to header 524b and the user who added the post corresponding to header 524c, but is not connected to the user who added the post corresponding to header 524c. In addition, the user of client system 130b is connected to the user who added the post corresponding to header 524b by fewer degrees of separation than the user that added the post corresponding to header 524c.

Accordingly, the social network display code, after receiving the degrees of separation information, has modified the order in which headers 524 are displayed. Social network display code has modified headers 524 such that header 524b is displayed first (at the top) because the fewest number of degrees of separation exist between the user of client system 130b and the user that added the post corresponding to header 524b. In addition, header 524c is listed second and header 524a is listed last because the user of client system 130b is not connected to the user that added the post corresponding to header 524a.

Figure 6A:
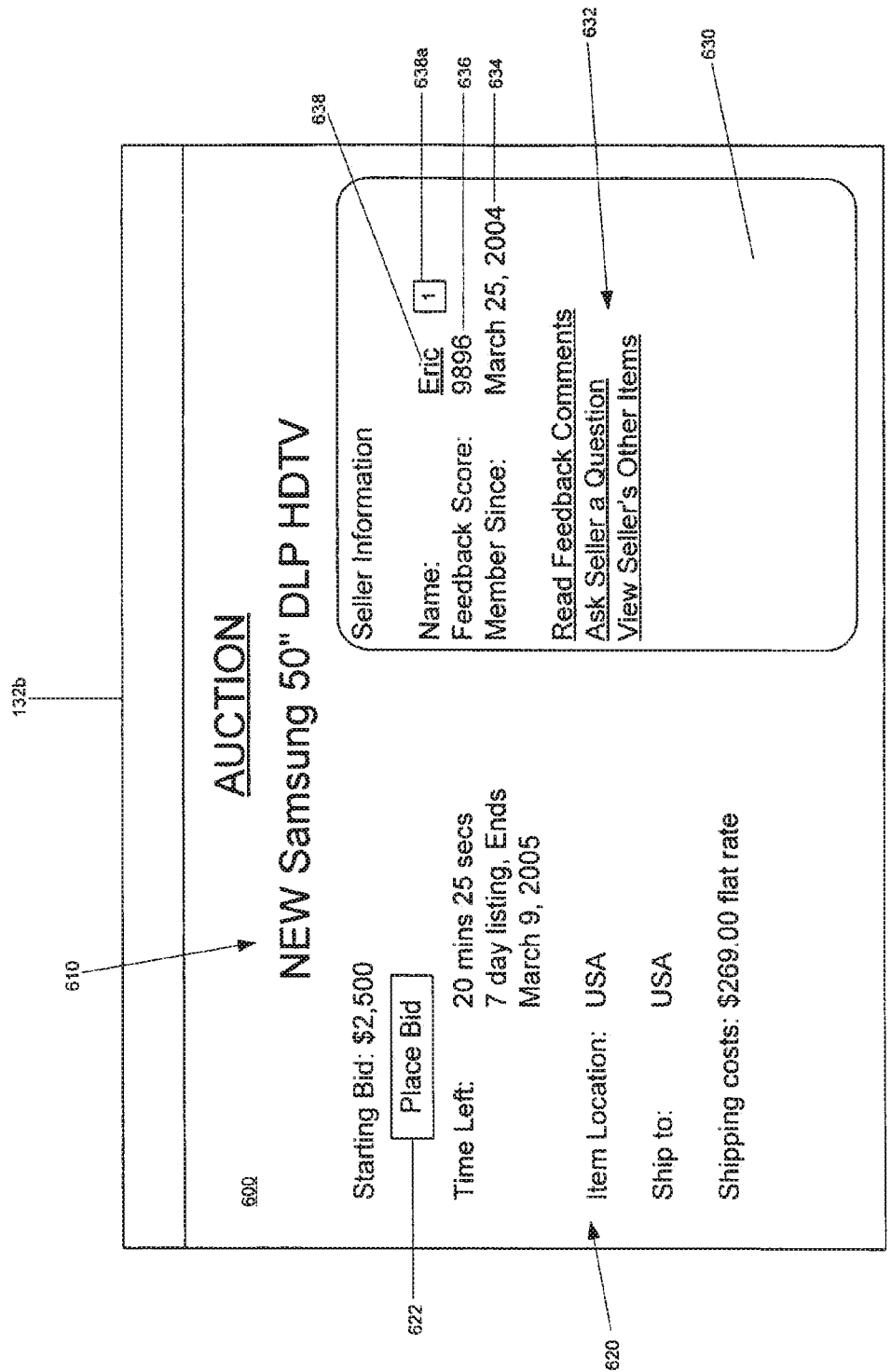
Figure 6B:
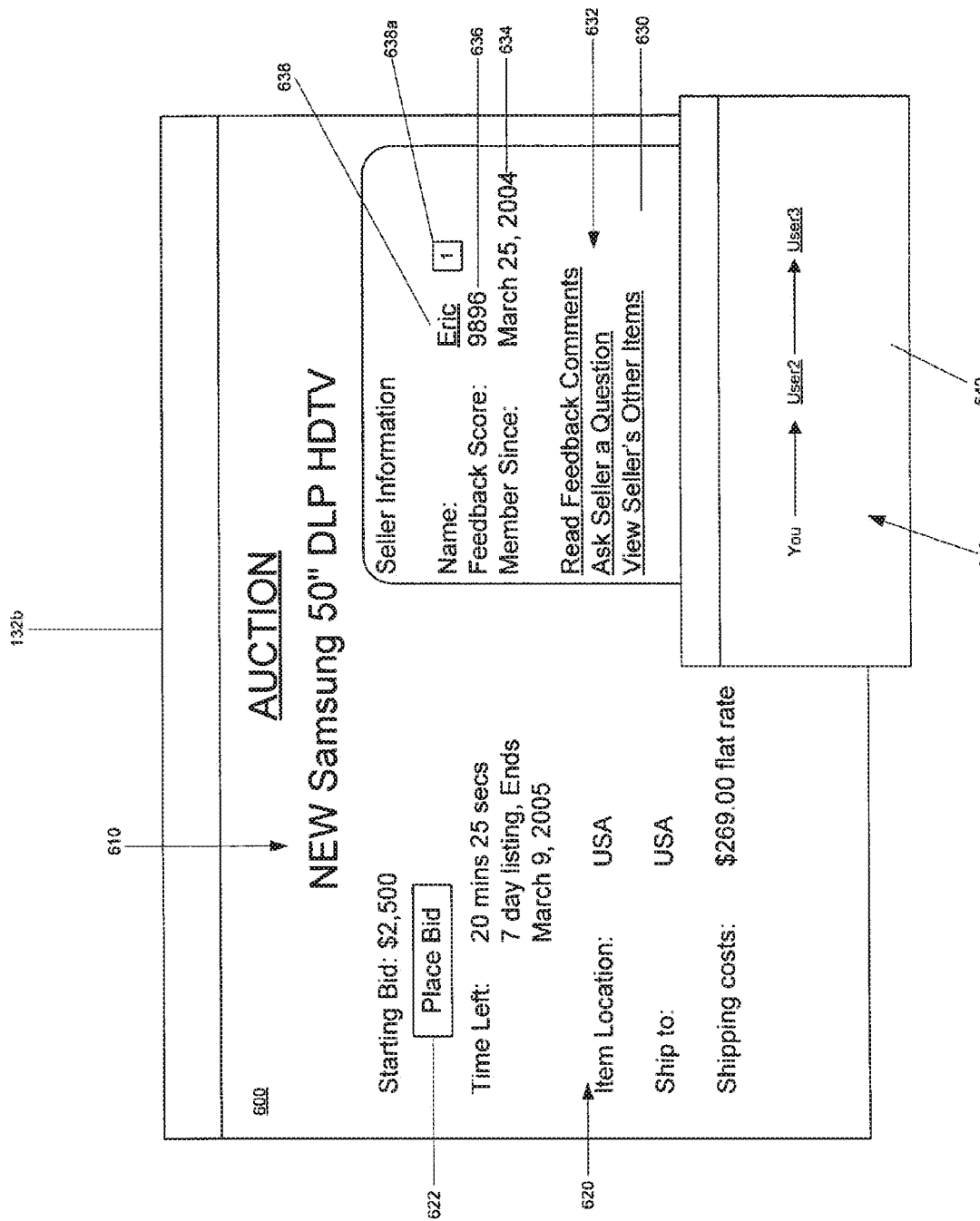
Figure 6C:
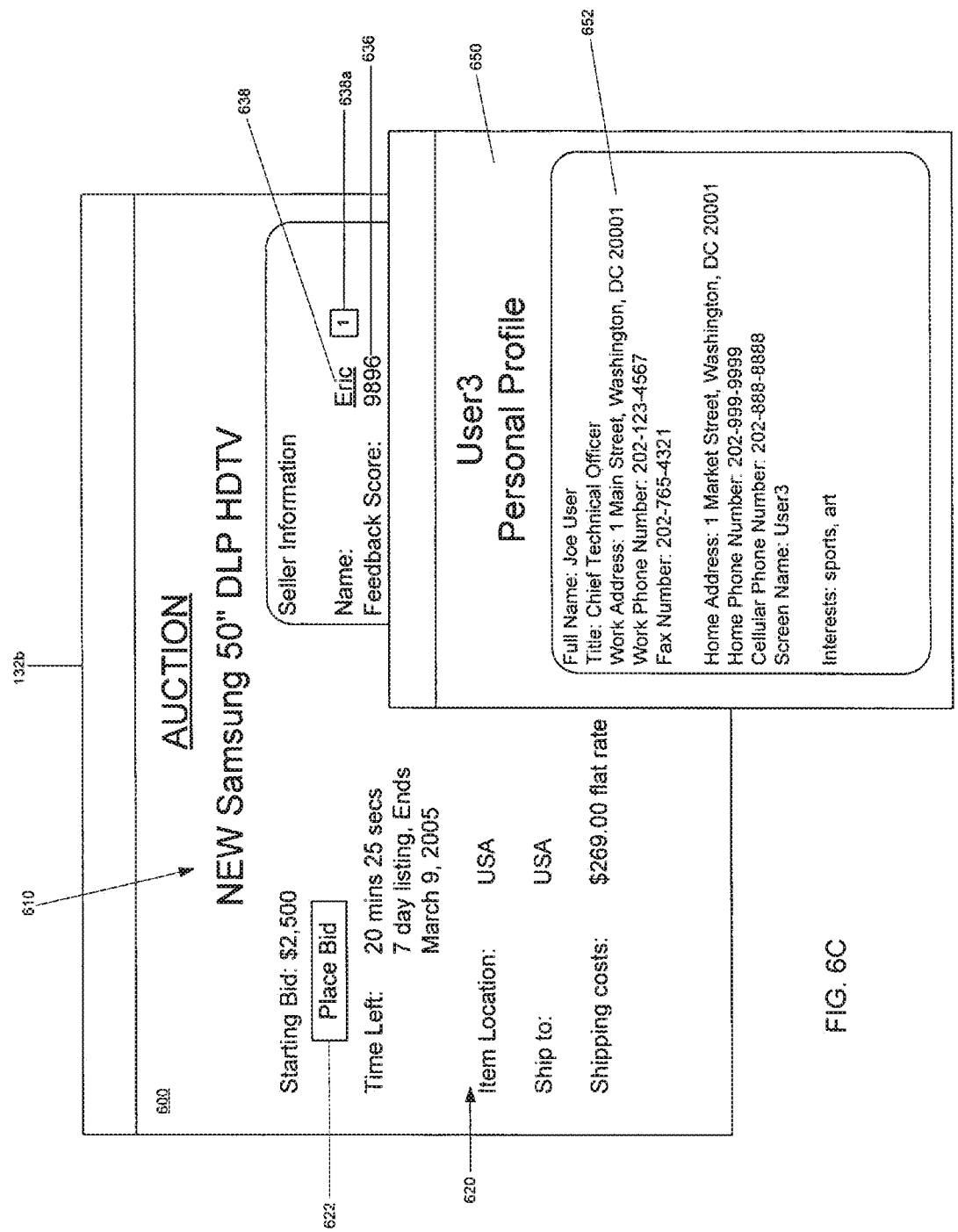

As other examples, FIGS. 6A-6C show various ways in which a web page 600 may be modified according to social networking information. In these examples, web page 600 provides access to an auction on an auction web site.

Referring to FIG. 6A, web page 600 includes a title 610 that describes the item being auctioned. Web page 600 also includes a section 620 that provides information about the auction, such as the starting bid, the time left until the auction is over, the location of the item being auctioned, where the seller is willing to ship the item, and the shipping cost of the item being auctioned. A button 622 allows a user to place a bid on the item being auctioned.

A section 630 includes information about the seller of the item. Section 630 includes hyperlinks 632 that allow the user to access to access feedback comments added by other users who have bought items from the seller, to send a question to the seller, and to view other items for sale or auction by the seller. Section 630 also displays the date 634 when the seller became a member of the auction site and a feedback rating 636, which may be based on negative or positive comments the seller has received from other users.

Contact information 638 for the seller is also displayed in section 630. In this case, the contact information is the third party username for the seller (the example "Eric" being shown). The social network display code has modified web page 600 to display an icon 638a next to contact information 638. Icon 638a displays the number of degrees of separation between the user viewing web page 450 (for example, the user of client system 130b) and the seller.

Referring to FIG. 6B, in one implementation, web page 600 also is modified so that a user is able to invoke a pop-up window 640 that displays the pathway 642 between the user and the seller. Window 640 can be invoked, for example, by selecting icon 638a. Window 640 represents the user viewing web page as "You," and represents the intermediate entities and the seller by their respective service provider usernames. In the example shown, the user (indicated by "You") is linked to User2, who in turn is linked to the seller, whose service provider username is User3.

For privacy concerns, some users may not want to have their information displayed in a pathway, such as the pathway 642. To accommodate such concerns, some implementations may permit users to opt out of having their information displayed in a pathway that connects a user to a linked user. For a user who has opted out of having information shown, pathway 642 may be modified, for example, by changing the user's screenname to "unknown," for example.

Referring to FIG. 6C, in another implementation, web page 600 also is modified so that a user is able to invoke a pop-up window 650 that displays profile information for the seller stored on service provider network 120. Social network display code may request such profile information from social network client application 134b, which in turn retrieves such information from social network server 124 or another server. Window 650 can be invoked, for example, by selecting icon 638a. Window 650 includes a section 652 that presents profile information for the seller stored by service provider network 120, such as the seller's name, job title, addresses, phone numbers, and interests.

Using an architecture such as the one shown in FIGS. 3A and 4A, where social network client application 134b executing on a client system 130b retrieves social network information and the content is modified based on the social network information using social network display code in the web page, may provide improved scalability as compared to an architecture in which web server 112 retrieves social network information, such as the one describe below with respect to FIG. 7A. The improved scalability may allow web server 112 to handle larger numbers of users at the same computing power of web server 112. Architectures in which web server 112 or another server on third party service provider network 110 retrieves social network information may, however, be more desirable depending on how social network information is used to modify the content or services of the third party service provider network 110.

Figure 7A:
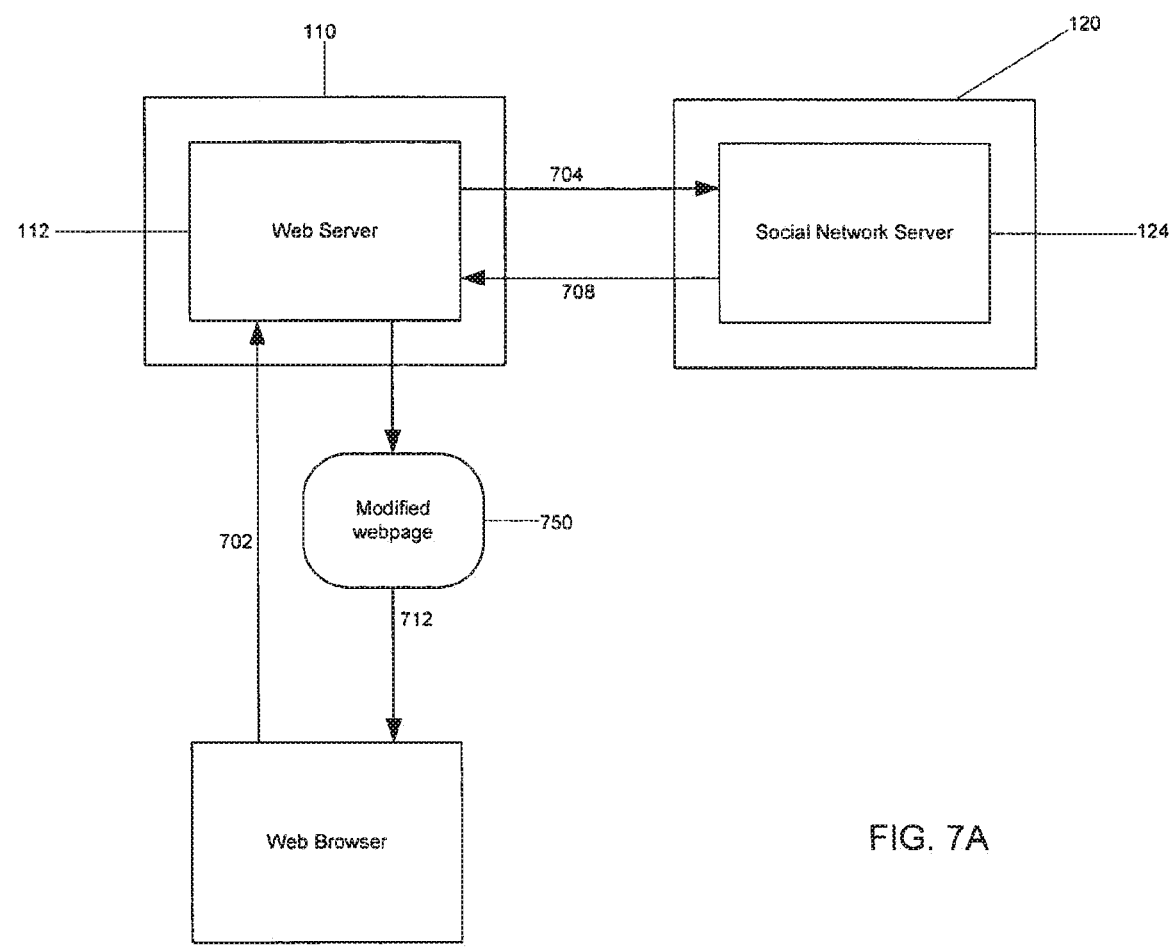
FIGS. 7A and 7B, collectively, show another implementation of the communications and process that may be performed when a user retrieves a web page from the web server of FIG. 1.
Figure 7B:
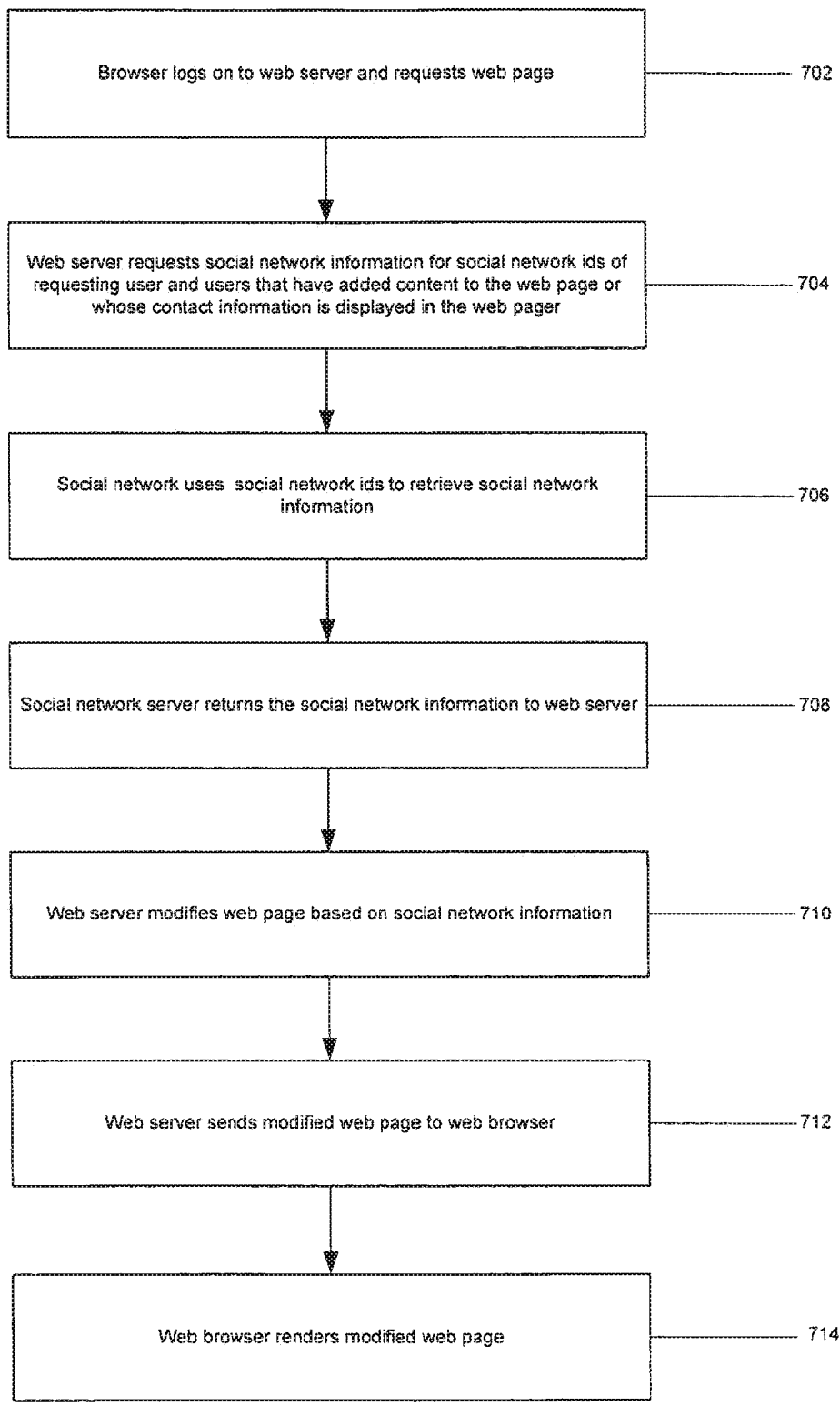

Referring to FIGS. 7A and 7B, in another implementation, web server 112 may request the social network information from social network server 122 and modify the web page based on this social network information before the web page is sent to web browser 132b. If the user who is requesting the web page, such as the user of client system 130b, has also registered with web server 112 using the process and communications described with respect to FIGS. 3A-3D, then web server 112 may also be storing a social network id for that user. That is, for example, web server 112 may have stored a social network id for the user of client system 130a and a social network id for the user of client system 130b. The user of client system 130b may log onto web server 112 before requesting a web page, so as to thereby allow web server 112 to identify and access the social network id of the user of client system 130b. Accordingly, if the user of client system 130b uses web browser 132b to request a web page that contains content added by, or contact information for, the user of client system 132a, web server 112 may access the social network ids for both of these users, and use the social network ids to request social network information from social network server 122. Web server 112 then may modify the web page based on this social network information and send the modified web page to web browser 132b.

More particularly, FIGS. 7A and 7B, collectively, show examples of communications and a process 700 for such an implementation. The user may use web browser 132b to log onto web server 112 and request a web page that contains content added by, or contact information for, other users, such as the user of client system 132a (702). The content added by the users, or the contact information for the users, may be associated with the social network id of the corresponding user. The social network ids may be associated with the content or contact information by being embedded in the HTML of the web page, for example, by using the "id" attribute as described above. Alternatively, web server 112 may use a program, such as a common gateway interface (CGI) script, to generate the HTML or other markup for the web page, and the other components the web page (e.g., scripts). In such a situation, the content or contact information may be stored in a database or other storage until the web page is requested. When the web page is requested, the CGI script accesses the content or contact information to dynamically generate the web page. In such a situation, the social network id may be associated with the content or contact information in the database or other storage.

Web server 112 then requests the social network information from social network server 124 (704). For example, the request for the web page may be directed to a program, such as a CGI script, executing on web server 112. When the request for the web page is received, the CGI script then accesses the social network id of the requesting user and the social network ids associated with the content or contact information to be included in the web page (for example, by accessing the HTML or other mark-up of the web page or by accessing a database that stores the content or contact information). The CGI script then may send to social network server 124 the social network ids, and other information as necessary.

The CGI script may do so, for example, by using an API provided for social network server 124. Functions similar to those described above may be implemented by the API. For example, the API may have the functions similar to the following:

- isDegrees (user_sn_id, site_id, sn_id, degrees), where user_sn_id is the social network id for the user requesting the web page, site_id uniquely identifies the third party service, sn_id is an array of one or more social network ids associated with the content or contact information, and degrees is a number. This function may return a boolean for each social network id in the sn_id array indicating whether the social network id in the array and the social network id of the user requesting the web page are within the number of degrees of separation specified by "degrees."
- getPath (user_sn_id, site_id, sn_id), where user_sn_id is the social network id for the user requesting the web page, site_id uniquely identifies the third party service, and sn_id is an array of one or more social network ids. This function may return for each social network id in the array an object containing the path between the social network id in the array and the social network id of the user requesting the web page.
- getDegrees (user_sn_id, site_id, sn_id), where user_sn_id is the social network id for the user requesting the web page, site_id uniquely identifies the third party service, and sn_id is an array of one or more social network ids. This function may return for each social network id in the array a number indicating the degrees of separation between the social network id in the array and the social network id of the requesting user.

Social network server 124 then uses the social network ids to determine the corresponding service provider usernames. Using the usernames, social network server 124 then determines the requested social network information using, for example, a social network list, such as the one shown in FIG. 2B (706), and returns the requested social network information to web server 112 (e.g., to the CGI script executing on web server 112, if implemented) (708).

Web server 112 then modifies the web page based on the social network information (710). For example, if a program such as a CGI script is implemented, the CGI script may modify the HTML or other markup of the web page based on the social network information. Alternatively, the CGI script may dynamically generate the HTML or other markup for the web page and other components of the web page, modifying the web page based on the social network information as the web page is generated. The web page may be modified in the ways described above, such as reordering, highlighting, or deleting content or contact information, inserting social network information into the web page, or making social network information or other information available in, for example, a pop-up window. Web server 112 then sends the modified web page 750 to web browser 132b (712), which then renders the web page 750 (714).

Figure 8B:
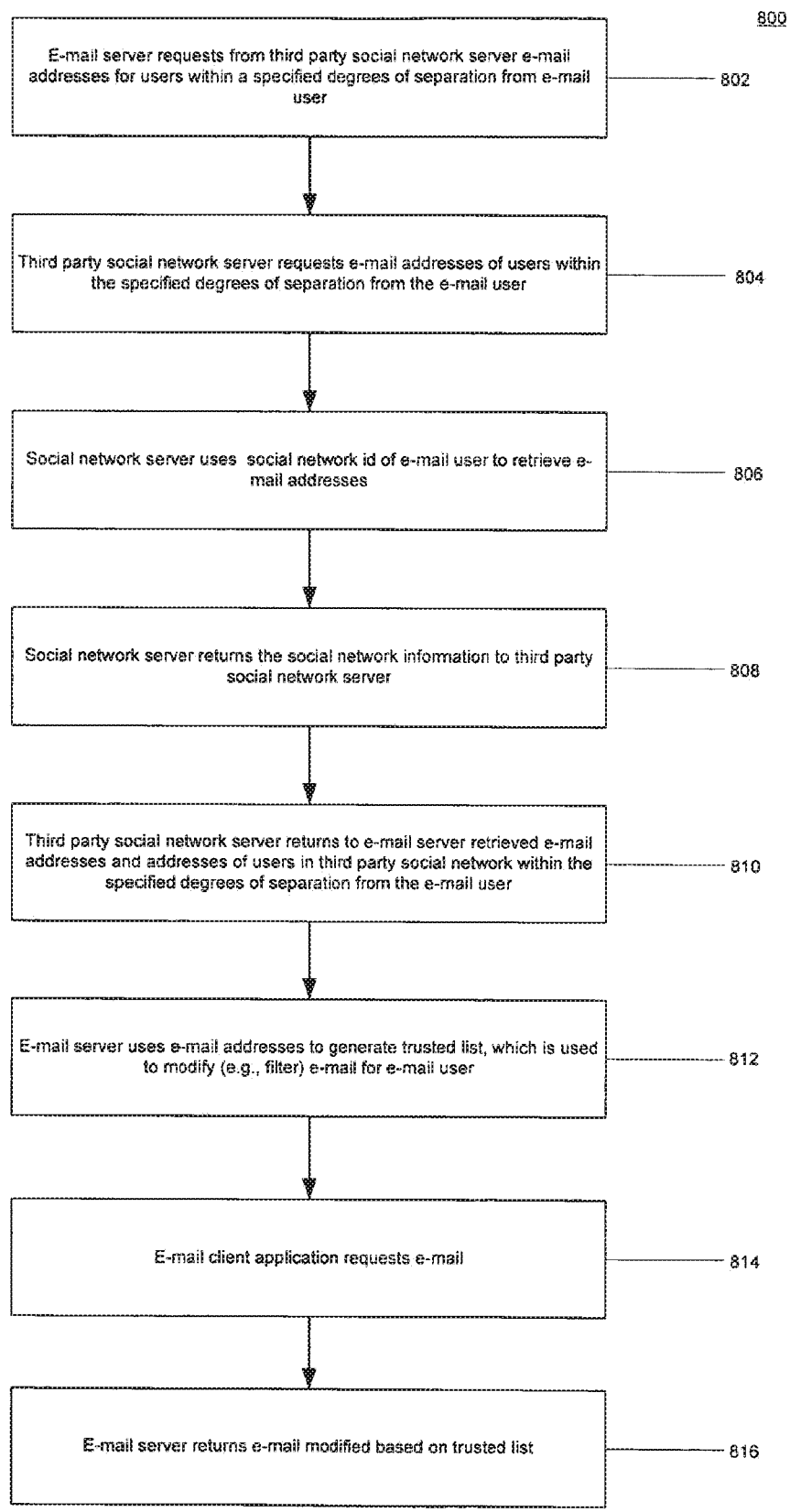

Referring to FIGS. 8A and 8B, in other implementations, third party service provider network 110 may maintain a social network for the members of third party online service provider network 110 (referred to as a third party social network), and may use the third party social network in providing services or content to the members of online service provider network 110. In addition, the third party service provider network 110 may modify these services or content based on the social network maintained by online service provider network 120. That is, a user may be a member of both the third party social network maintained by third party online service provider 110 and a member of the social network maintained by online service provider 120.

In general, if the user of third party network 110, such as the user of client system 130b, has registered using the process and communications described with respect to FIGS. 3A-3D, then third party online service provider network 110 may also be storing a social network id for that user. The third party online service provider network 110 may use the social network id to retrieve social network information related to the user from the social network maintained by the service provider network 120. This retrieved social network information may be used to modify the content or services provided by the third party service provider network 110 based on the third party social network.

In particular, with respect to FIG. 8A, the third party online service provider uses social network information to inform filtering of e-mail. In this implementation, third party online service provider network 110 includes an e-mail server 112a in place of (or in addition to) web server 112. Third party online service provider network 110 also includes a social network server 114 (referred to as a third party social network sever), which may be similar to social network server 122, except that third party social network server 114 maintains social network information for the members of third party online service provider network 110. The user of client system 130b may use an e-mail client 130b-1 instead of web browser 132b to access e-mail from e-mail server 112a.

Third party online service provider network 110 may use social network information, of example, to create a trusted list of senders for a user, such as the user of client system 130b, and use the trusted list to inform filtering of the e-mails sent to the user. For example, the e-mail server may use the trusted list as a white list to allow e-mail from e-mail addresses on the trusted list, while blocking e-mail from e-mail addresses not on the trusted list. Methods of filtering e-mail or other communications based on trusted lists developed from social network information is further described in U.S. application Ser. No. 10/746,232, filed Dec. 29, 2003, and titled "Degrees of Separation for Handling Communications," which is incorporated herein in its entirety for all purposes.

FIGS. 8A and 8B show examples of communications and a process 800 for such an implementation. E-mail server 112a may create the trusted list for a user, such as the user of client system 130b, by first requesting, from social network server 114, the e-mail addresses for other users within a certain number of degrees of separation from the user (802). Social network server 114 then requests the social network information from social network server 124 (804). To do so, social network server 114 may access the social network id of the user and send to social network server 124 the social network id, and other information as necessary. Social network server 114 may do so, for example, by using an API provided for social network server 124. For example, the API may have a function similar to the following: getEmails (sn_id, degrees), where sn_id is the social network id for the user and degrees is the number of degrees of separation requested by e-mail server 112a. This function may return an array of the e-mail addresses for users within the specified degrees of separation.

Social network server 124 uses the social network id to determine the associated username. The associated username is then used to determine the users within the specified degrees of separation, and their corresponding e-mail addresses (806). Once determined, social network server 124 returns the e-mail addresses to social network server 114 (808).

Social network server 114 returns to e-mail sever 112a the e-mail addresses retrieved from social network server 124, in addition to the e-mail addresses of users within the third party social network that are within the specified degrees of separation (810). E-mail server 112a uses the e-mail addresses to generate the trusted list and to filter or otherwise modify the e-mails received for the user accordingly (812). When e-mail client application 132b-1 subsequently requests the e-mails for the user of client system 130b (814), e-mail server 816 provides the filtered or otherwise modified e-mails to e-mail client application 132b-1, which displays them to the user (816).

A number of other implementations are possible depending on the content or services provided by third party service provider 110, and the social network information made available through the API for social network server 122. For example, in an implementation similar to that shown in FIG. 8A, the third party service provider network may provide general social network services, such as those provided by Friendster, Inc. of Silicon Valley, Calif. (located at www.friendster.com). Such services allow a user to view profiles and access content maintained by members of the user's social network, in addition to allowing the user to communicate with members of the user's social network. Through the API provided for social network server 122, information may be retrieved for the members in the user's social network maintained by online service provider 120, and the information may be used to link those members, through the user, to the members in the user's social network maintained by social network server 122. Such information may include profiles or content maintained by these members and/or contact information for these members. This may allow members of the user's third party social network maintained by third party service provider 110 to be connected, through the user, to members of the user's social network maintained by online service provider 120, and may allow members of the third party social network to navigate to, interact with, or view information about the members of the user's social network maintained by online service provider 120, and may provide mechanisms for the members of the user's third party social network to communicate with the members of the user's social network maintained by online service provider 120. For example, a member of the user's third party social network may be able to access profile information for a member of the user's social network maintained by service provider 120. The profile information may contain contact information for the member, such as an e-mail address for an e-mail account provided by service provider 120.

Instead of showing the member's contact information, the third party service provider network 110 may provide a form, such as a web form, for the member of the third party social network to enter and send messages to the other member. Once the member submits the message, the third party service provider network 110 may send the message using, for example, the other member's e-mail address for an e-mail account provided by service provider 120.

In addition, one user in a social network may try to access content maintained by another user in the social network. For example, a first user may attempt to access a calendar maintained by a second user. Whether the user can access the calendar, or what information is shown on the calendar, may be based on the types of relationships connecting the first user to the second user (e.g., whether the relationships are family relationships, friend relationships, or business relationships). Such techniques are more fully described in U.S. application Ser. No. 11/079,524, filed concurrently with this application on Mar. 15, 2005, titled "Social Networking Permissions," now U.S. Pat. No. 8,595,146, issued Nov. 26, 2013, and incorporated herein in its entirety for all purposes. The third party online service provider network 110 may communicate with social network server 122 to implement such permissions across the service provider boundaries. For example, a member of the third party social network may be connected to a member of the social network maintained by online service provider network 120 through a user that is a member of both networks. The member of the third party social network may use the services provided by third party service provider to attempt to access content maintained by the member of the online service provider 120. Third party social network server 114 and social network server 114 may communicate to determine the type of access based on the types of relationships connecting the members, and to provide the appropriate type of access to the requested content.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

Furthermore, elements of different implementations may be combined, deleted, added, supplemented or modified to yield further implementations. In addition, actions or communications do not necessarily need to occur in the order in which they are depicted. Accordingly, other implementations are within the scope of the following claims.

What is claimed is:

1. A computer-implemented method of sharing social network information between online social networks, the method comprising:
  receiving, from a first user over an electronic network, a request for a web page provided by a first service provider;
  receiving, from a second user over the electronic network, a request for the web page;
  obtaining, from a second service provider over the electronic network, relationship information indicating a relationship between the first user and second user; and
  transmitting a modified version of the web page to the second user over the electronic network, wherein the web page is modified based on the obtained relationship information.

2. The method of claim 1, wherein the request for the web page includes registration information comprising a username for registering the first user with the first service provider, and a unique social network identifier (ID) that identifies the first user within a social network maintained by a second service provider is stored in relation to the username registered for the first user by the first service provider.

3. The method of claim 2, wherein obtaining the relationship information indicating the relationship between the first user and second user comprises:
  transmitting, to the second service provider over the electronic network, a request for the relationship information for the first user and second user within the social network, the request including the unique social network ID of the first user and a unique social network ID of the second user; and
  receiving, from the second service provider, the relationship information in response to the transmitted request.

4. The method of claim 1, wherein the web page is modified by at least one of highlighting content presented on the web page that relates to the second user and highlighting an identifier of the second user.

5. The method of claim 1, wherein the web page is modified by accessing content on the web page relating to the second user and changing a position of the content to be displayed on the web page.

6. The method of claim 1, wherein the relationship information comprises a number of degrees of separation between the first user and the second user; and
  wherein the web page is modified by at least one of adding a visual cue to be displayed in proximity to content on the web page relating to the second user and adding an identifier of the second user, the visual cue indicating the number of degrees of separation between the first user and the second user.

7. The method of claim 1, wherein the relationship information comprises a value representing a reputation of the second user in the social network; and
  wherein the web page is modified by at least one of displaying a visual cue in proximity to content displayed on the web page related to the second user and displaying an identifier of the second user in the web page, the visual cue indicating the value of the reputation for the second user.

8. The method of claim 1, wherein the relationship information comprises information regarding members of the social network maintained for the first user by the second service provider, the members of the social network including the second user; and
  wherein the web page is modified for transmission to the second user based on the information regarding the members of the social network maintained for the first user by the second service provider.

9. The method of claim 3, wherein the unique social network ID of the second user is obtained as part of a web page from the second service provider, the unique social network ID of the second user is associated with web page content that was at least one of added by the second user and added by contact information for the second user within the web page, the unique social network ID of the second user is stored in association with a registered username for the second user by the first service provider, and the method further comprises:
  receiving, from the second user via the electronic network, a request for a second web page maintained by the first service provider, the request for the second web page including the registered username of the second user;
  retrieving the unique social network ID of the second user based on the registered username of the second user to which it is associated;
  requesting, from the second service provider, social network information maintained by the second service provider for the second user based on the unique social network ID retrieved for the second user; and
  generating, responsive to receiving the requested social network information from the second service provider, a modified version of the second web page for transmission to the second user by modifying at least one of content and services provided through the second web page by the first service provider based on the social network information.

10. The method of claim 3, wherein the unique social network ID of the first user is associated with web page content that was at least one of added by the first user and added by contact information for the first user within the web page, and transmitting the modified version of the web page further comprises:
  accessing content added to the web page by at least one of the first user and the contact information for the first user in the web page using the unique social network ID of the first user; and
  generating the modified version of the web page for transmission to the second user by at least one of highlighting the content added to the web page by the first user and highlighting the contact information for the first user in the web page.

11. The method of claim 1, further comprising:
  receiving, from the second user over the electronic network, a request for a second web page maintained by the first service provider;
  requesting, from the second service provider, social network information for the second user, the social network information identifying members of one or more social networks maintained for the second user by the second service provider;
  identifying, upon receiving the requested social network information from the second service provider, content added to the second web page by users who are not members of the second user's one or more social networks, based on the social network information; and
  generating a modified version of the second web page for transmission to the second user by modifying a visibility of the identified content of the second web page to be displayed for the second user.

12. A social network server maintained on an online service provider network, the social network server comprising:
   a processor;
   a memory device that stores instructions, which when executed by the processor causes the processor to perform a method of:
   receiving, from a first user over an electronic network, a request for a web page provided by a first service provider;
   receiving, from a second user over the electronic network, a request for the web page;
   obtaining, from a second service provider over the electronic network, relationship information indicating a relationship between the first user and second user; and
   transmitting a modified version of the web page to the second user over the electronic network, wherein the web page is modified based on the obtained relationship information.

13. The social network server of claim 12, wherein the request for the web page includes registration information comprising a username for registering the first user with the first service provider, and a unique social network identifier (ID) that identifies the first user within a social network maintained by a second service provider is stored in relation to the username registered for the first user by the first service provider.

14. The social network server of claim 13, wherein obtaining the relationship information indicating the relationship between the first user and second user comprises:
   transmitting, to the second service provider over the electronic network, a request for the relationship information for the first user and second user within the social network, the request including the unique social network ID of the first user and a unique social network ID of the second user; and
   receiving, from the second service provider, the relationship information in response to the transmitted request.

15. The social network server of claim 12, wherein the web page is modified by at least one of highlighting content presented on the web page that relates to the second user and highlighting an identifier of the second user.

16. The social network server of claim 12, wherein the web page is modified by accessing content on the web page relating to the second user and changing a position of the content to be displayed on the web page.

17. The social network server of claim 12, wherein the relationship information comprises a number of degrees of separation between the first user and the second user; and
   wherein the web page is modified by at least one of adding a visual cue to be displayed in proximity to content on the web page relating to the second user and adding an identifier of the second user, the visual cue indicating the number of degrees of separation between the first user and the second user.

18. The social network server of claim 12, wherein the relationship information comprises a value representing a reputation of the second user in the social network; and
   wherein the web page is modified by at least one of displaying a visual cue in proximity to content displayed on the web page related to the second user and displaying an identifier of the second user in the web page, the visual cue indicating the value of the reputation for the second user.

19. The social network server of claim 12, wherein the relationship information comprises information regarding members of the social network maintained for the first user by the second service provider, the members of the social network including the second user; and
   wherein the web page is modified for transmission to the second user based on the information regarding the members of the social network maintained for the first user by the second service provider.

20. A non-transitory computer-useable medium storing a program for using social network information from a second online service provider network to modify content or services provided by a first online service provider network, the program comprising instructions for causing a computer to perform a method of sharing social network information between online service providers, the method comprising:
   receiving, from a first user over an electronic network, a request for a web page provided by a first service provider;
   receiving, from a second user over the electronic network, a request for the web page;
   obtaining, from a second service provider over the electronic network, relationship information indicating a relationship between the first user and second user; and
   transmitting a modified version of the web page to the second user over the electronic network, wherein the web page is modified based on the obtained relationship information.

* * * * *